United States Patent [19]

Ishii et al.

[11] Patent Number: 4,982,279
[45] Date of Patent: Jan. 1, 1991

[54] TELEVISION RECEIVER HAVING A MEMORANDUM FUNCTION

[75] Inventors: Takaaki Ishii, Daito; Motoaki Asao, Higashiosaka; Kiyoshi Matsumoto, Tondabayashi, all of Japan

[73] Assignee: Sanyo Electric Co., Ltd., Moriguchi, Japan

[21] Appl. No.: 224,622

[22] Filed: Jul. 27, 1988

[30] Foreign Application Priority Data

| Jul. 28, 1987 | [JP] | Japan | 62-189503 |
|---|---|---|---|
| Jul. 30, 1987 | [JP] | Japan | 62-191956 |
| Aug. 3, 1987 | [JP] | Japan | 62-194048 |
| Aug. 5, 1987 | [JP] | Japan | 62-196122 |
| Aug. 20, 1987 | [JP] | Japan | 62-206777 |
| Sep. 8, 1987 | [JP] | Japan | 62-224609 |
| Sep. 18, 1987 | [JP] | Japan | 62-235429 |

[51] Int. Cl.$^5$ ............................................. H04N 5/14
[52] U.S. Cl. ..................................... 358/160; 358/22; 358/183
[58] Field of Search ............... 358/21 R, 22, 160, 181, 358/182, 183, 193.1, 194.1

[56] References Cited

U.S. PATENT DOCUMENTS

| 3,943,280 | 3/1976 | Kimura et al. | 358/183 |
|---|---|---|---|
| 4,238,773 | 12/1980 | Tsuboka et al. | 358/183 |
| 4,488,179 | 12/1984 | Kruger et al. | 358/194.1 |
| 4,528,585 | 7/1985 | Bolger | 358/160 |
| 4,746,983 | 5/1988 | Hakamada | 358/183 |
| 4,768,095 | 8/1988 | Wada et al. | 358/183 |
| 4,772,941 | 7/1988 | Noble | 358/183 |
| 4,821,086 | 4/1989 | Mcneely et al. | 358/183 |
| 4,855,813 | 8/1989 | Russell et al. | 358/183 |

FOREIGN PATENT DOCUMENTS

| 66181 | 5/1980 | Japan . | |
|---|---|---|---|
| 0047171 | 4/1981 | Japan | 358/183 |
| 0140775 | 11/1981 | Japan | 358/183 |
| 0109477 | 7/1982 | Japan | 358/183 |

OTHER PUBLICATIONS

*Television Technology*, Dec. 1984, pp. 31–37.

*Primary Examiner*—John W. Shepperd
*Attorney, Agent, or Firm*—Armstrong, Nikaido, Marmelstein, Kubovcik & Murray

[57] ABSTRACT

A digital television receiver capable of storing a desired television image information in response to an image storage instruction signal and reproducing the stored image information as a still image on the screen of a display tube (116) at any time as required. This digital television receiver comprises a control circuit (117', 122a) for writing desired image information in any of field memories (120a, 120b) in response to pressing of a memo key (128) of a remote controller (118), and a control circuit (117', 122b) for repeatedly reading out image information written in the field memories (120a, 120b) in response to pressing of a call key (129) of the remote controller (118) and supplying the information to a color matrix circuit (114).

13 Claims, 20 Drawing Sheets

SERIAL WRITE CYCLE

SERIAL READ CYCLE

DATA RESTORE CYCLE

DATA TRANSFER CYCLE

ROW ADDRESS COUNTER CYCLE (a)

(b) Sd
(c) Kd (a)

(b) Sd
(c) Kd

TELEVISION RECEIVER HAVING A MEMORANDUM FUNCTION

BACKGROUND OF THE INVENTION

1. Field of the Invention

This invention generally relates to television receivers and particularly to an improvement of a television receiver provided with a field memory capable of storing video signals of one field. More particularly, this invention relates to a construction of a television receiver capable of storing desired video signals in one field and reproducing the stored video signals of one field as a still image on a television receiver as required.

2. Description of the Prior Art

Recent developments in semiconductor technologies have led to the realization of large-capacity memories and high-speed analog-to-digital (A/D) converters, making possible digital image processing. Examples of devices used in such digital image processing are field memories. Such a field memory is capable of receiving and storing A/D converted video signals for one image (corresponding to one field) on a television screen. FIG. 1 shows a flow of a video signal in the case of using a field memory.

Referring to FIG. 1, an analog video signal is sampled in an A/D converter 1 at a predetermined frequency and converted to a digital video signal. The digital video signal from the A/D converter 1 is supplied to a field memory 2, where it is stored. The field memory 2 stores pixel information for one field. The pixel information (the digital video signal) stored in the field memory 2 is successively read out in the order of storing, so as to be supplied to a digital-to-analog (D/A) converter 3. The D/A converter 3 converts the digital video signal to an analog video signal and supplies it to a succeeding signal processing circuit (e.g., a video amplifier). A serial access memory having a construction as shown in FIG. 2 is generally used as the field memory 2.

Referring to FIG. 2, the serial access memory includes a memory cell array 10 for storing pixel information for one field. The memory cell array 10 includes memory cells arranged in a matrix comprising rows and columns. The number of memory cells (i.e., a memory capacity) is determined dependent on a sampling frequency for conversion from an analog signal to a digital signal (i.e., the number of pixels in one field).

In order to select a row in the memory cell array 10, there are provided an address counter 11 for providing a row address, an address buffer 12 for accepting the row address from the address counter 11 and providing an internal row address, and an address decoder 13 for decoding the internal row address from the address buffer 12 to select a corresponding row of the memory cell array 10. The address counter 11 increments the row address by one in response to a signal $\overline{INC}$ and decrements the row address by one in response to a signal $\overline{DEC}$. The row address is reset in response to a signal $\overline{RCR}$. Thus, it becomes possible to select corresponding rows successively from the memory cell array 10 one by one or by skipping by a predetermined number of rows.

In order to write pixel information into the memory cell array 10 and to read out the stored pixel information, there are provided a data transfer gate 15 to be turned on in response to a timing signal from a read/write timing generating circuit 14, a line buffer 16 for latching data for one row of the memory cell array 10, a serial selector 17 for determining speeds of writing and reading of data, and a Y gate 18 for successively connecting each latch portion of the line buffer 16 to a data input/output buffer 19 in response to an output of the serial selector 17. The serial selector 17 is activated in response to a timing signal from a timing generating circuit 20 to successively turn on gate transistors of the Y gate 18 in response to a timing signal from a serial control timing generating circuit 21.

The timing generating circuit 20 generates various timing signals in response to a signal $\overline{RAS}$.

The read/write timing generating circuit 14 generates timing signals for reading and writing of data in response to a signal $\overline{WE}$.

The serial control timing generating circuit 21 is enabled in response to the timing signal from the read/write timing generating circuit 14 to generate a signal synchronized with a shift signal $\overline{SC}$ and to apply serial transfer timing for data.

The data input/output buffer 19 serially transfers input data $D_{IN}$ and output data $D_{OUT}$ in response to a control signal from the serial control timing generating circuit 21.

Pixel data for one horizontal scanning line on a television screen are stored in memory cells of one row as shown in FIG. 3. Accordingly, a distribution of pixel data on the television screen corresponds to a distribution of pixel data in the memory cell array 10 with a relation of 1:1 correspondence.

Now, operation of the field memory will be briefly described.

1. Serial write cycle

As shown in FIG. 4, this cycle is executed when the signal $\overline{WE}$ is changed to low (L) level at the time of input of the signal $\overline{SC}$. Data is accepted by the input/output buffer 19 at a falling edge of the signal $\overline{SC}$. The data thus accepted is transferred to the line buffer 16 through the Y gate 18 under control of the serial selector 17, so that it is latched in the line buffer 16. At that time, the written data can be outputted.

2. Serial read cycle

In this cycle, the data latched in the line buffer 16 are read out through the Y gate 18 and the data input/output buffer 19 at a falling edge of the signal $\overline{SC}$ when the signal $\overline{WE}$ is at high (H) level, as shown in FIG. 5.

3. Data restore cycle

In this cycle, the data for one row latched in the line buffer 16 are simultaneously written in a selected row in the memory cell array 10. This cycle is executed by opening the data transfer gate 15 when the signal $\overline{WE}$ is at L level at a fall of the signal $\overline{RAS}$, as shown in FIG. 6. At that time, a row is selected based on the row address from the address counter 11.

4. Data transfer cycle

In this cycle, data for a selected row in the memory cell array 10 are transferred to the line buffer 16. This cycle is executed when the signal $\overline{WE}$ is at H level at a fall of the signal $\overline{RAS}$, as shown in FIG. 7.

5. Row address counter cycle

In this cycle, a row address to be provided by the address counter 11 is defined. This cycle is executed when any one of the signals $\overline{INC}$, $\overline{DEC}$ and $\overline{RCR}$ is at L level with the signal RAS being at H level. Control of the field memory is performed by changing the signal $\overline{INC}$ to L level for each horizontal scanning line (that is, in response to a horizontal synchronizing signal) and by inputting the signal $\overline{RCR}$ for each vertical scanning period.

Such a field memory as described above is widely utilized in various digital image processing technologies. An example of application of such a field memory is a so-called digital television receiver (for example as indicated in the technical journal "Television Technology" '84 Dec. Issue, pp. 31–37).

Such a conventional digital television receiver using a field memory has a picture-in-picture function for displaying two screens on a television screen and a still image display function for temporarily stopping a moving image to represent it to as a still image, and other functions.

The picture-in-picture function is to display two screens V1 and V2, i.e., the larger screen V1 and the smaller screen V2 in a multiple manner on the television screen. The picture-in-picture function also includes a function of displaying a still image on the scaled-down screen V2. FIG. 10 schematically shows a construction of a digital television receiver having the picture-in-picture function.

Referring to FIG. 10, signal processing is performed through two paths.

The first path is a signal processing path for display of a sub screen (a scaled-down screen). This path includes: a signal processing circuit 31 for receiving an analog video signal from a sub screen video signal input terminal 30 and performing necessary processing for the signal; a timing pulse generator 32 for providing various timing signals (clocks) based on horizontal and vertical synchronizing signals detected by the signal processing circuit 31; and a memory controller 34 responsive to the clock from the timing pulse generator 32, for controlling writing and reading of pixel data for a field memory 33. An A/D converter 35 for sampling the analog signal in response to the clock from the memory controller 34 is provided between the signal processing circuit 31 and the field memory 33.

The signal processing circuit 31 provides a luminance signal Y and color-difference signals R−Y and B−Y by YC separation of the input analog video signal and also detects the horizontal synchronizing signal and the vertical synchronizing signal. The memory controller 34 provides various control signals shown in FIG. 2.

The second processing path is a main screen display path, which includes an A/D converter 36 for sampling an analog signal from a main screen video signal input terminal 50 at a predetermined sampling rate, and a digital signal processing circuit 37 for performing predetermined processing for an output of the A/D converter 36.

The digital signal processing circuit 37 performs signal processing, similar to that in the signal processing circuit 31, in a digital manner. Horizontal and vertical synchronizing signals detected by the digital signal processing circuit 37 are supplied to the memory controller 34.

A screen display path includes: a multiplexer 38 for selectively passing either an output of the field memory 33 or an output of the digital signal processing circuit 37; a D/A converter 39 for converting an output of the multiplexer 38 to an analog signal; a video amplifier 40 for receiving an output of the D/A converter 38 and providing color signals R, G and B; and a CRT 41 for displaying a corresponding image in response to an output of the video amplifier 40.

The multiplexer 38 selects either sub screen data or main screen data to pass therethrough under control of the main controller 34. As a result, it is made possible to represent a sub screen in a scaled-down manner at a predetermined position in the main screen. The scaled-down display of the sub screen is realized by increase of a data reading speed from the field memory 33 and suitable skipping of row addresses.

During the sub screen display operation, the video signal from the input terminal 30 is written in the field memory 33 and it is read out therefrom in synchronization with the main screen, so that it is supplied to the multiplexer 38. The multiplexer 38 provides, under control of the memory controller 34, image information including the sub screen video signal inserted in a main screen video signal.

During the still image display operation, writing of data in the field memory 33 is inhibited and video data for one field stored in the field memory 33 is repeatedly read out and supplied to the multiplexer 38. Thus, the image data for one field in the field memory 33 is repeatedly reproduced at a predetermined position in the main screen and, thus, a still image is obtained.

The above described still image display can be made also in the case of displaying only the main screen and, in addition, a desired scene can be fixed as a still image and displayed on the sub screen.

Accordingly, the conventional still image display function enables an image currently displayed to be still and displayed on the television screen in response to a still image instruction signal.

However, according to the conventional still image function, if the display of the still image is cancelled or completed, new video signals are written in the field memory and read out. More specifically, the still image information displayed till then is updated with new different image information. Therefore, the still image displayed previously cannot be displayed again on the television screen.

On the other hand, there are some television programs in which a large amount of information is displayed at a time in a short period, such as a program of cooking in which materials used for cooking are simultaneously displayed in the form of letter information or a weather forecast for all parts of the country. In those cases, if one wants to have exact knowledge of the information by temporarily storing the image including the information and reproducing it afterwards to thoroughly observe it, it is not possible in the conventional digital television receiver having the still image display function to reproduce again the still image once the display of the still image has been cancelled or completed.

Thus, the conventional digital television receivers make no allowance for construction for temporarily storing television image information and reproducing afterwards the stored image as required.

SUMMARY OF THE INVENTION

An object of the present invention is to provide a digital television receiver capable of storing and holding, in a field memory, image information currently received, and also capable of reproducing, as required, the image information stored in the field memory as a still image on a television screen.

Another object of the present invention is to provide a digital television receiver capable of verifying whether or not a desired image has been stored in the field memory when an image storing instruction is issued.

Still another object of the present invention is to provide a digital television receiver in which a content stored in the field memory is initialized at turn-on of power supply and no disagreeable impression is given to the user even if the content stored in the field memory is reproduced on a television screen after turn-on of the power supply.

A further object of the present invention is to provide a digital television receiver capable of always storing only stable image information to reproduce it without storing any disturbed image information immediately after changing of channels (or broadcasting stations).

A still further object of the present invention is to provide a digital television receiver in which visual distinguishability of a reproduced still image can be improved.

Another aspect of the present invention is to provide a digital television receiver having good operability, capable of storing information of a plurality of screens and accordingly reproducing plural kinds of still images.

A still further object of the present invention is to provide a digital television receiver having an excellent cost-performance, comprising a field memory formed by a low-cost general purpose dynamic random access memory.

A digital television receiver in accordance with the present invention at least comprises an instruction signal generator for generating an image storage instruction signal and a still image reproduction instruction signal, means for storing image information currently received in response to the storage instruction signal from the instruction signal generator, and means for reading the stored image information and displaying it on a television screen in response to the still image reproduction instruction signal.

Preferably, the image information storing means includes a plurality of field memories. Each field memory stores image information of a predetermined area out of image information for one field.

Preferably, there is provided means for adding a border surrounding a display area of a reproduced still image in response to the still image reproduction instruction signal. This border has a color corresponding to each of the field memories.

More preferably, there is provided means for writing predetermined significant information in the field memories in response to turn-on of operation power supply.

More preferably, there is provided means for inhibiting writing of data in the field memories for a predetermined period in response to a reception of channel change instruction signal.

More preferably, there is provided means for designating an order of writing data into and an order of reading data from a plurality of field memories.

Each field memory is formed by a dynamic random access memory capable of performing high-speed serial access operation. M significant data are read out from the dynamic random access memory in a divided manner by N times. The field memory comprises a counter for counting data reading clocks, N-staged shift registers each for shifting data in response to one reading clock, and means for successively decreasing the number of stages of the shift registers in response to an output of the counter.

The above described construction makes it possible to temporarily store desired television screen information and to reproduce, as required, a clear still image on the television screen easily and with good visual distinguishability.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 11:
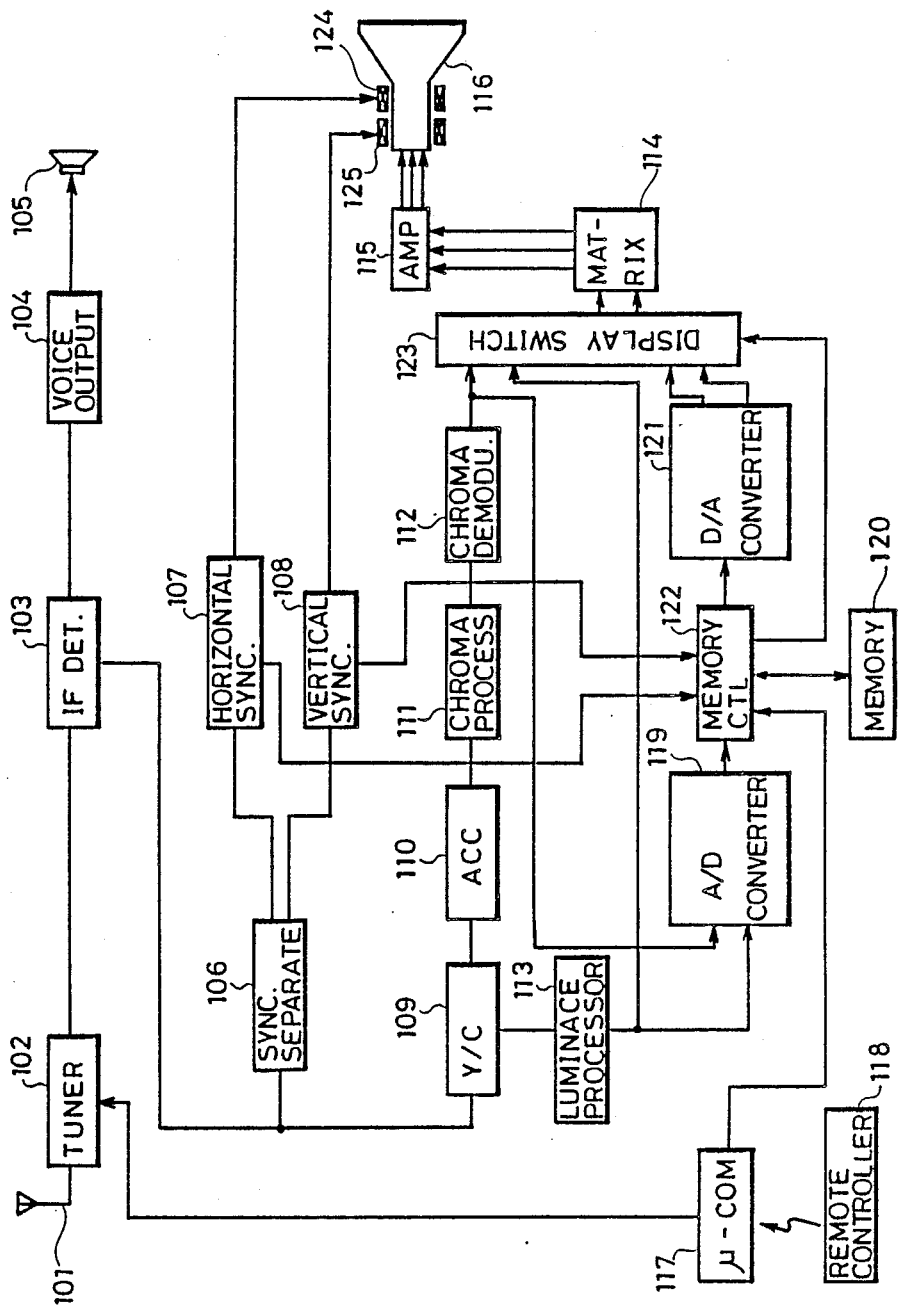
FIG. 11 is a block diagram showing an overall construction of a digital television receiver of an embodiment of the present invention.

Referring to FIG. 11, an overall construction of a digital television receiver according to an embodiment of present invention will be described.

The television receiver comprises: a tuner 102 as a signal input portion for selecting a television signal of a corresponding channel (broadcasting station) out of television signals applied to an antenna 101 in response to channel selection information from a channel selection microcomputer 117 and converting the selected television signals to intermediate frequency signals (IF signal); and a voice image detecting circuit 103 for detecting an image IF signal and a voice IF signal from the IF signal provided from the tuner 102.

A voice reproduction portion comprises a voice output circuit 104 for reproducing and amplifying the voice signal from the detecting circuit 103, and a speaker 105 for generating voice corresponding to the voice signal from the voice output circuit 104.

An image signal processing portion comprises a color signal processing portion and a luminance signal processing portion. The color signal processing portion comprises a YC separating circuit 109 for separating and detecting a luminance signal and a color signal from a composite image signal provided from the voice image detecting circuit 103, an ACC (auto color control) circuit 110 for detecting a level of color burst included in the color signal from the YC separating circuit 109 and adjusting a gain of the color signal to cause the signal level to be constant, a color signal processing circuit 11 for applying necessary processing to a chroma signal from the ACC circuit 110, and a color signal demodulation circuit 112 for demodulating the color signal in the form of a color-difference signal upon receipt of an output from the color signal processing circuit 111.

The luminance signal processing portion comprises a luminance signal processing circuit 113 for receiving a luminance signal component from the YC separating circuit 109 and applying necessary processing thereto to demodulate the luminance signal.

In order to apply reproduction timing for the image signal, there are provided a sync. separating circuit 106 for detecting a horizontal synchronizing signal and a vertical synchronizing signal from the image signal from the voice image detecting circuit 103, a horizontal synchronizing circuit 107 for generating a signal defining a horizontal scanning line on the television screen in response to the horizontal synchronizing signal from the sync. separating circuit 106, a vertical synchronizing circuit 108 for generating a signal defining a vertical synchronizing line on the television screen in response to the vertical scanning signal from the sync. separating circuit 106, a horizontal deflecting coil 124 for scanning an electron beam in a display tube (CRT) 116 in a horizontal direction in response to the signal from the horizontal synchronizing circuit 107, and a vertical deflecting coil 125 for scanning the electron beam in the CRT 116 in a vertical direction in response to the signal from the vertical synchronizing circuit 108.

In order to reproduce the image signal, there are provided a matrix circuit 114 for compositing the color-difference signal and the luminance signal applied thereto to generate three primary color signals (tri-color signals) of R (red), G (green) and B (blue), and a video amplifier 115 for amplifying the primary color signals from the matrix circuit 114 and supplying those signals to the CRT 116.

In order to generate various operation control signals such as the signal for channel selection information, the channel selection microcomputer 117 is provided to control the tuner 102 for channel selection operation in response to information from an associated operation portion (not shown) provided in the television receiver or from the remote control transmitter 118. The microcomputer 117 controls not only the channel selection operation but also various operations such as turn-on and turn-off of power supply of the television receiver and turn-up and turn-down of volume on the receiver in response to operation signals generated from the operation portion or the remote control transmitter 118.

The above described construction is well known as the construction of a conventional television receiver circuit. According to the present invention, the digital television receiver further comprises the below described construction, so that a memorandum function is provided therein. More specifically, the digital television receiver of the present invention comprises: an A/D converter 119 for receiving an analog chroma signal from a color signal demodulating circuit 112 and an analog luminance signal from the luminance signal processing circuit 113 and sampling those signals with a predetermined sampling rate to convert them to digital signals, a field memory 120 for storing a video signal of a predetermined area out of an image signal of an arbitrary field from the A/D converter 119, a memory controller 122 for controlling writing of data into and reading of data from the field memory 120, a D/A converter 121 for converting digital data read out from the field memory 120 to an analog signal, and a display selection circuit 123 for selectively passing the signals from the color signal demodulating circuit 112 and the luminance signal processing circuit 113, or the signal from the D/A converter 121.

Operation of the memory controller 122 is controlled by the microcomputer 117 and the memory controller 122 controls timing for writing and reading data into and from the field memory 120 based on the horizontal synchronizing signal from the horizontal synchronizing circuit 107 and the vertical synchronizing signal from the vertical synchronizing circuit 108.

The display selection circuit 123 supplies the color-difference signal from the color signal demodulating circuit 112 and the luminance signal from the luminance signal processing circuit 113 to the matrix circuit 114 in a first mode. The display selection circuit 123 supplies the color-difference signal and the luminance signal from the D/A converter 121 to the matrix circuit 114 in a second mode. Mode selection of the display selection circuit 123 is effected under control of the memory controller 122.

Figure 12:
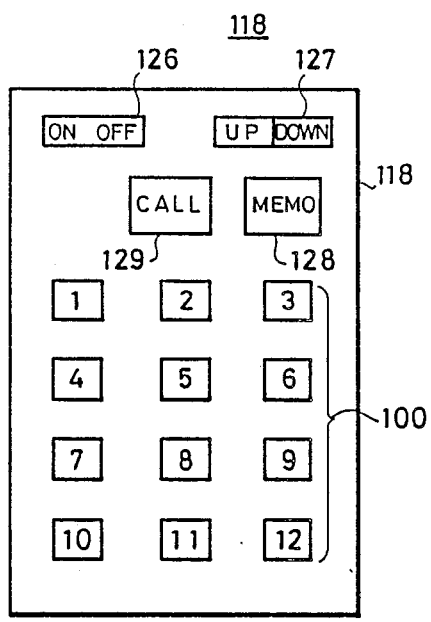
FIG. 12 shows an example of a construction of a remote control transmitter used in a digital television receiver according to the present invention.

FIG. 12 shows in appearance an example of the construction of the remote control transmitter 118 used in the television receiver according to the present invention.

Referring to FIG. 12, the remote control transmitter 118 comprises a power supply key 126 for turning on and off the power supply of the television receiver, an up/down key 127 of a seesaw button type for turning up or down the volume, a ten-key set 100 for directly selecting a broadcast channel, a memo key 128 for instructing storage of an image signal, and a call key 129 for generating a signal instructing reproduction of a still image of the stored image signal. The control signals from the transmitter 118 are transmitted to the microcomputer 117 in the form of infrared rays.

Figure 13:
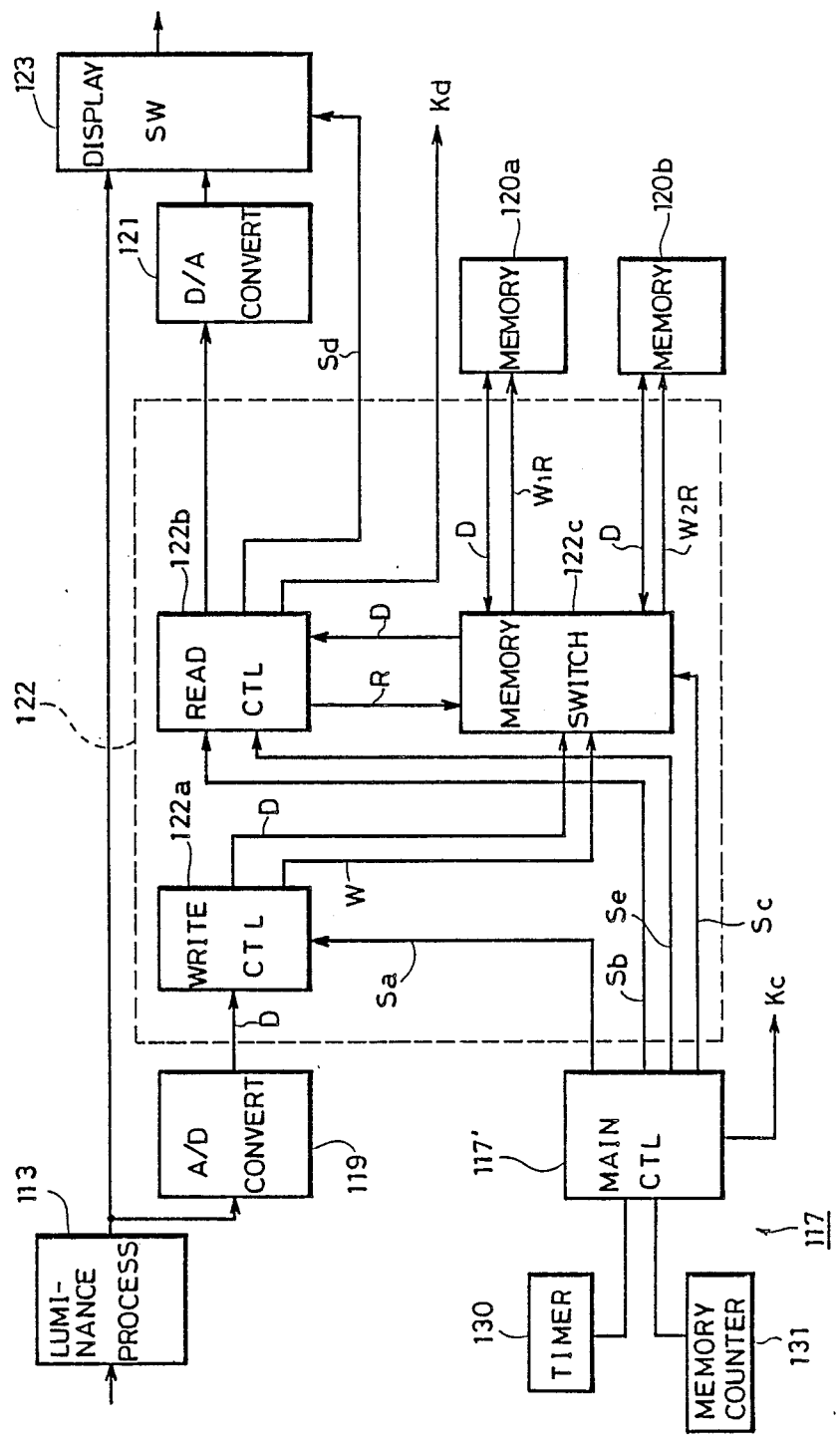
FIG. 13 shows a construction of a main part of the digital television receiver of the embodiment shown in FIG. 11.

FIG. 13 is a block diagram showing a detailed construction of a main portion in FIG. 11.

Referring to FIG. 13, the microcomputer 117 comprises a main control portion 117', a timer circuit 130 and a memory counter 131. The timer circuit 130 is operated at the time of turn-on of the power supply and at the time of selection of a channel to measure predetermined time periods. The memory counter 131 performs counting operation each time an access is made to a field memory 120a or 120b, and it designates the field memory to be accessed. The main control portion 117' generates a writing control signal Sa, a reading control signal Sb, a memory selection control signal Sc and a control signal Se defining a data reading period, when a video signal storage instruction or a video signal reproduction instruction is issued. Although the main control portion 117', the timer circuit 130 and the memory counter 131 in FIG. 13 are shown in the form of hardware, they are actually formed by software (a program).

The memory controller 122 comprises: a writing control circuit 122a enabled in response to the control signal Sa for writing video signal data from the A/D converter 119 into either of the field memories 120a and 120b through a memory selection circuit 122c; a reading control circuit 122b responsive to the control signals Sb and Se for reading video signal data of the field memory 120a or 120b through the memory selection circuit 122c and supplying the data to the D/A converter 121; and the memory selection circuit 122c responsive to the control signal Sc from the main control portion 117' for selecting either the field memory 120a or the field memory 120b. The plurality of field memories, e.g., the two field memories 120a and 120b in FIG. 13 are provided to store the digital video signals. Each of the field memories 120a and 120b is capable of storing effective video signals of a predetermined area out of video signals of one field. Thus, video signals of different fields can be stored in the respective field memories 120a and 120b, each storing video signals corresponding to one field at the maximum.

Although the configuration shown in FIG. 13 is only the configuration for the luminance signal, this illustration is made for the purposes of avoiding complexity of the drawing and facilitating the following description. In practice, the same configuration is also formed for the color-difference signals.

Figure 14A:
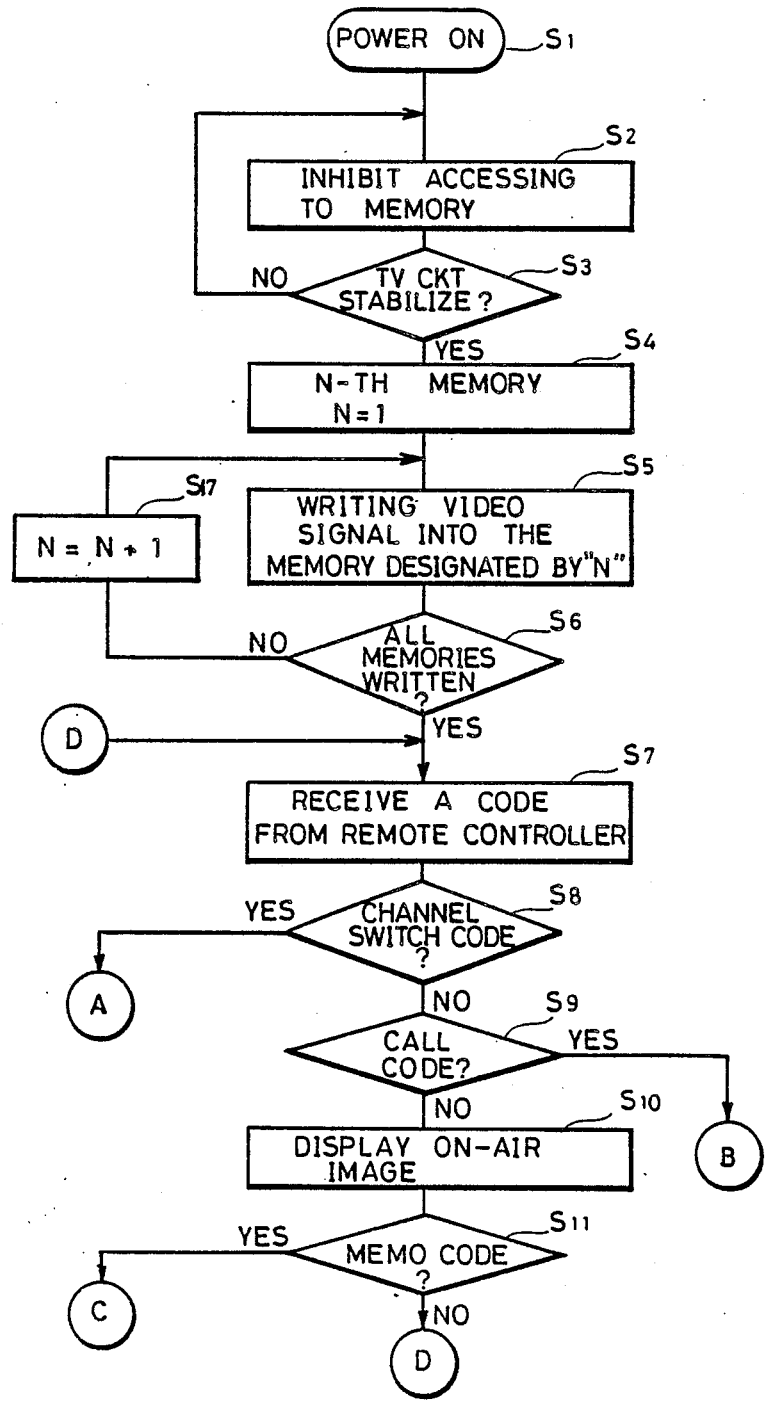
FIGS. 14A and 14B are flowcharts showing operation of the digital television receiver of the embodiment of FIG. 11.
Figure 14:
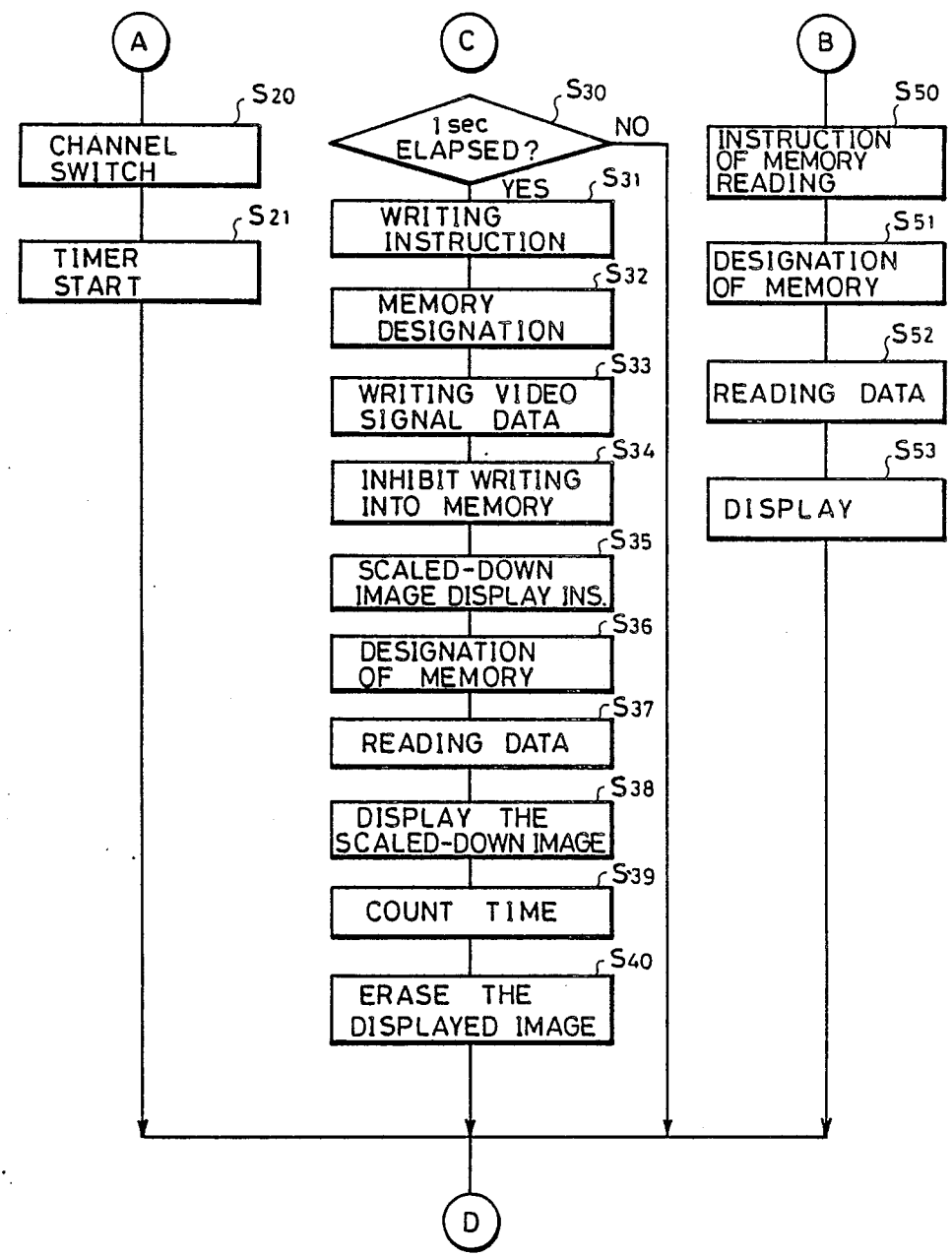
Figure 15:
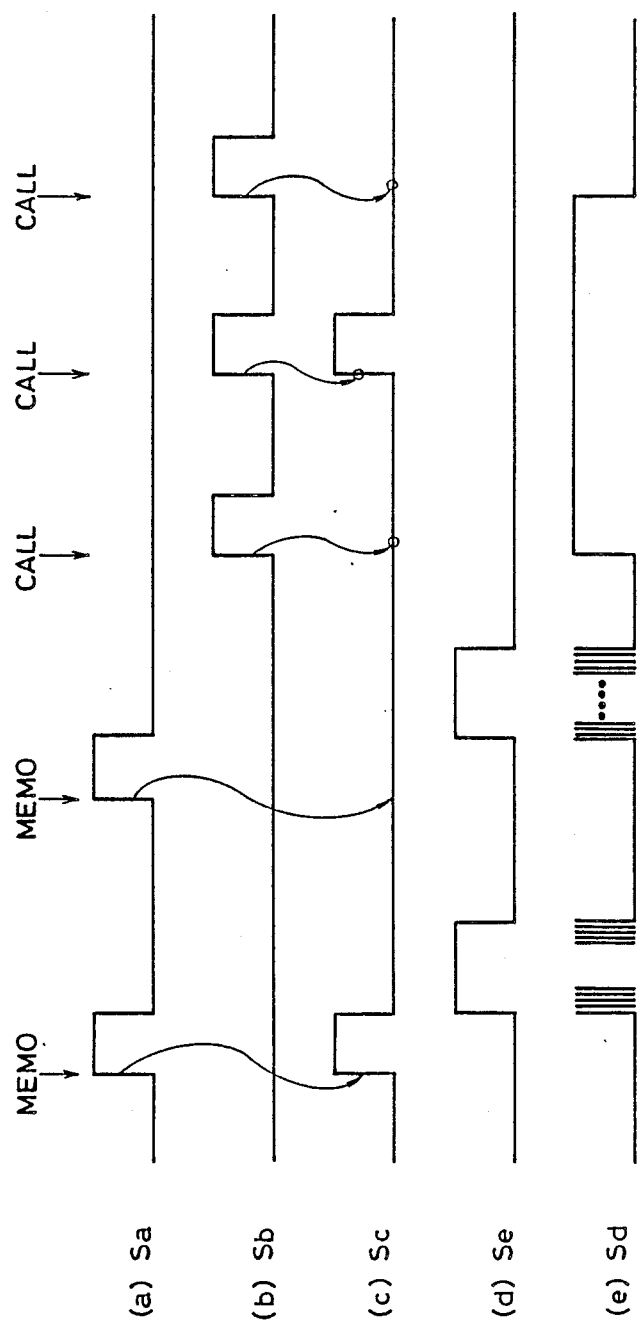
FIG. 15 is a waveform diagram of control signals for storage and reproduction of image information in the digital television receiver of the embodiment of FIG. 11.

Referring now to FIGS. 14A and 14B as the operation flowcharts, FIG. 15 as the control signal waveform diagram, and FIGS. 16A to 19 showing display examples on the screen, memorandum operation of the digital television receiver of the above described embodiment will be described.

(i) Initialization of the memories at turn-on of power supply of the television receiver The power supply of the television receiver is turned on by pressing the power supply key 126 of the remote control transmitter 118 and under control of the microcomputer 117. In response to the turn-on of the power supply, each circuit of the television receiver operates and thus the luminance signals are provided from the luminance signal processing circuit 113 and supplied to the display selection circuit 123 and the A/D converter 119. The digital luminance signal from the A/D converter 119 is supplied to the writing control circuit 122. However, the writing instruction signal Sa and the reading instruction signal Sb are not generated from the main control portion 117' in a predetermined period after the turn-on of the power supply because of the functioning of the timer circuit 130. The timer circuit 130 is activated in response to the power-on instruction. Thus, writing and reading of data into and from the field memories 120a and 120b are inhibited during the predetermined period after the turn-on of the power supply (the step S2). When the main control portion 117' determines that a count value of the timer circuit 130 reaches a predetermined value and that operation of each circuit in the television receiver becomes stable as the result of sufficient rise of the power supply voltage (the step S3), the main control portion 117' supplies the memory designation signal Sc to the memory selection circuit 122c to enable the memory selection circuit 122c to select the first field memory 120a (the step S4).

Then, the main control portion 117' supplies the writing instruction signal Sa to the writing control circuit 122a and increments the count value of the memory counter 131 by one. In response to the instruction signal Sa, the writing control circuit 122a supplies a writing signal W and data D for approximately one field of the digital image signal currently received to the selected first field memory 120a, so that video signals for approximately one field are written in the first field memory 120a (the step S5). When the writing of the data in the first field memory 120a is completed, the main control portion 117' examines the count value of the memory counter 131 and determines whether data are written in all of the field memories (the step S6). If data is not written in any field memory, the main control portion 117' returns to the step S5 to supply the memory designation signal Sc again to the memory selection circuit 122c. The memory selection circuit 122c switches to select another field memory 120b. Then, in the same manner as described above, video signal data for approximately one field of video signals currently received are written in the second field memory 120b (the step 17).

Figure 17:
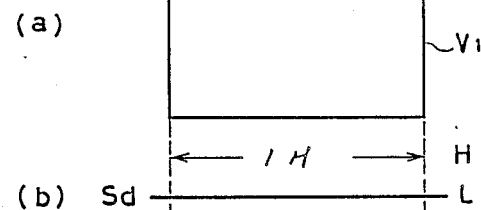
FIGS. 17 to 19 each show a relation between a control signal and a display on a television screen at the time of reproduction of a still image in the digital television receiver of the above mentioned embodiment.

When writing of data in all of the field memories (the two field memories in the present embodiment) is completed, the main control portion 117' terminates the data writing operation into the field memories after verification of the content of the memory counter 131. Thus, the initialization of the field memories is completed. After the completion of the initialization, the first field memory 120a is in a state enabled to be designated next by the memory counter 131. However, since the reading control circuit 122b is in a non-activated state during the memory initialization operation and after the completion of the initialization, no output is provided from the D/A converter 121. In addition, the display selection circuit 123 is in the first mode for selecting the luminance signal supplied from the luminance signal processing circuit 113, while the selection signal Sd from the reading control circuit 122b is at L level. Accordingly, only a normal television image screen V1 is provided on the television screen as shown in FIG. 17 (the steps S7 to S11).

Figure 16A:
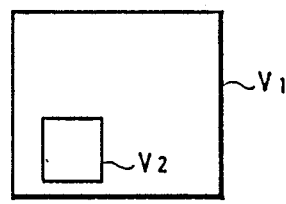
FIGS. 16A and 16B illustrate examples of display on the television screen at the time of reproduction of a still image in the television receiver of the above mentioned embodiment.
Figure 16B:
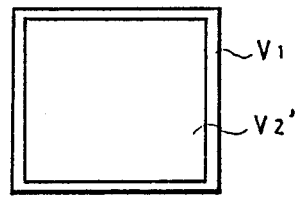

Since arbitrary image information currently received is written in the first and second field memories 120a and 120b by the main control portion 117' after the turn-on of the power supply as described above, the image automatically written in any of the first and second field memories 120a and 120b can be displayed as a still image on the television screen even if the call key 129 is operated before operation of the memo key 128 to be described below (see FIG. 16B). This is for the purposes of avoiding the below described disadvantages. The field memories 120a and 120b are generally formed by dynamic random access memories which are volatile memories. For this reason, no signal is stored in the first and second field memories 120a and 120b at the time of turn-on of the power supply. If the content of the field memory where no information is written is displayed on the television screen by operation of the call key 129, only noise would be reproduced and displayed as a still image, causing unpleasant impression to the user. In order to avoid creation of such unpleasant impression, initialization of the field memories is effected. Accordingly, information to be written in the first and second field memories 120a and 120b after turn-on of the power supply is not limited to image information currently received and it may be any significant information. In this case, although it is necessary to provide another memory for storing the significant information such as a ROM (read only memory), creation of unpleasant impression on the user can be prevented.

In addition, since initialization signal data are written in the first and second field memories 120a and 120b after operation of each circuit in the television receiver has been sufficiently stable (that is, the power supply voltage has been sufficiently raised) after turn-on of the power supply, stable normal video signals can be written in the field memories 120a and 120b.

At the time of initialization of the field memories 120a and 120b, operation for displaying a scaled-down still image of the written image (for confirmation) on the television screen is not performed as is different from the case of operating the memo key 128 described later.

(ii) Operation for channel selection

In order to select a desired channel (broadcasting station) the user operates the ten-key set 100 of the remote control transmitter 118, whereby a code signal designating the desired channel is transmitted to the microcomputer 117 through infrared rays. The channel selection microcomputer 117 (the main control portion 117') receives the code signal (the step S7) and determines whether the received code signal is a channel selection code signal or not (the step S8). If it is the channel selection code signal (a broadcasting station designating code signal), the microcomputer 117 supplies a tuning voltage corresponding to the designated channel to the tuner 102 to select the channel (the step S20). At the same time, the timer circuit 130 is caused to start counting operation (the step S21). Writing of data into the field memories 120a and 120b is inhibited until counting of a predetermined period by the timer circuit 130 is completed. More specifically, now, it is considered a case in which, after transmission of the channel selection code signal from the remote control transmitter 118, the memo key 128 is pressed. In this case, if the main control portion 117' detects the time counted by the timer circuit 130 and if the time does not attain a predetermined value, e.g., 1 second, the microcomputer 117 invalidates the input of the memo key 128 so that data may not be written in the field memories.

In other words, a received image is not stable immediately after the selection of the channel and if such an image is stored in a field memory, it means that a disturbed unstable image is stored and accordingly a disturbed image will be reproduced as a still image. Consequently, input of the memo key 128 is invalidated in a predetermined period (about 1 second in this embodiment) until the received image becomes stable after the selection of the channel, whereby any disturbed image immediately after the selection of the channel can be prevented from being written in the field memories.

(iii) Operation in the case of pressing the memo key

Now, description is made on a case in which the memo key 128 of the remote control transmitter 118 is pressed in a normal stable receiving condition of the television receiver to issue the image storage instruction (the step S11). In this case, the first control signal is transmitted from the transmitter 118 through infrared rays. The microcomputer 117 (the main control portion 117') supplies the writing instruction signal Sa to the writing control portion 122a in response to the first control signal (as shown in (a) of FIG. 15) if the predetermined period (about 1 second) has elapsed after the selection of the channel (the step S30). The writing control circuit 122a supplies the writing signal W and the currently received digital video signal (the luminance signal in the drawing) obtained from the A/D converter 119 to the memory selection circuit 122c, in response to the signal Sa. The memory selection circuit 122c is initialized to select the first field memory 120a based on the memory designation signal Sc from the main control portion 117' after the initialization of the memories at turn-on of the power supply as described above. Accordingly, when the memo key 128 is pressed on, the digital video signals and the writing signal W are supplied to the first field memory 120a. As a result, video signal information of a predetermined effective area (corresponding for example to 210H; H: a horizontal scanning period) out of one field is written in the first field memory 120a in place of previously written information (the steps S31 to S33).

Writing of the effective video signal within one field into the field memory is effected after a predetermined number of horizontal synchronizing signals (supplied from the horizontal synchronizing circuit 107) have been counted since the memory controller 122 received the vertical synchronizing signal from the vertical synchronizing circuit 108. Such writing operation is also performed in the same manner at the time of the above described initialization in (i).

The reason for writing only the video signal data of 210H within one field into the field memory is that significant information such as letter information is generally displayed in that area.

When the video signals for one field are written in the first field memory 120a, the main control portion 117' inhibits writing of data from the writing control circuit 122a into the first field memory 120a (the step S34). After the inhibition of the writing, the main control portion 117' supplies a scaled-down display control signal Se to the reading control portion 122b (see FIG. 15). The reading control portion 122b supplies a reading signal R to the memory selection circuit 122c in response to the control signal Se. On the other hand, the main control portion 117' provides the memory designation signal Sc to the memory selection circuit 122c simultaneously with the output of the scaled-down display control signal Se (the step S36). The memory designation signal Sc is applied to control the memory selection circuit 122c so that a field memory where writing of data has been completed, that is, the first field memory 120a is selected (the step S36). This control is performed by adapting the memory selection circuit 122c so that the first field memory 120a and the second field memory 120b may be selected at H level and L level of the memory designation signal Sc, respectively, for example. More specifically, as shown in FIG. 15, after the first pressing of the memo key 128, the writing instruction signal Sa rises to H level and since the memory designation signal Sc at this time is at H level, data is written in the first field memory 120a. Immediately after that, the scaled-down display control signal Se rises to H level and the data is read out. At this time, the memory designation signal Sc is at L level and the field memory where the data is to be read out is the first field memory 120a already determined by the memory designation signal Sc before this reading.

When the reading control circuit 122b receives the scaled-down display control signal Se, a third mode is set in which data is read out at a speed n times higher than the normal reading speed (in the second mode) (in the step S37). Thus, the digital video signal written in the first field memory 120a is compressed on a time base and supplied to the D/A converter 121. While the digital video signal is compressed on the time base with respect to the horizontal axis of the screen, data is read out every other scanning line from the field memory 120a on the vertical axis (in the case of the scaled-down screen being ¼ of the television screen).

Figure 18:
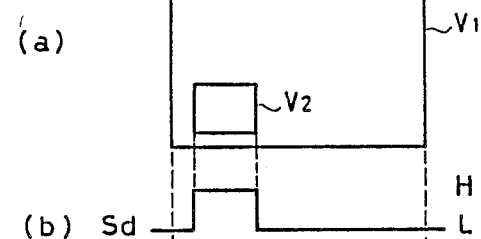
Figure 19:
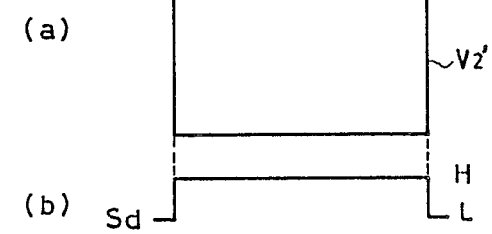

The D/A converter 121 converts the time-base compressed digital video signal to a time-base compressed analog video signal and supplies it to the display selection circuit 123. The display selection circuit 123, in a scaled-down screen display period, is set to the second mode in which the selection control signal Sd from the reading control circuit 122b rises to H level (as shown in FIGS. 15 and 18) and the video signal from the D/A converter 121 is selected. FIG. 18 shows a waveform of the selection signal Sd in one horizontal scanning period in which a scaled-down screen V2 exists. The display selection circuit 123 selects the luminance signal (the video signal) supplied from the luminance signal processing circuit 113 when the selection signal Sd is at L level. As a result, the content of the first field memory 120a is read out in a period corresponding to the sub screen V2 in a main screen V1, whereby an image V2 (for confirmation) based on the video signal stored in the first field memory 120a is displayed as a still image scaled-down at a predetermined size ratio at a predetermined position (a lower left corner in this embodiment) in the normal television screen V1 (the step S38), as shown in FIGS. 16A and 18(a). The position of display of the scaled-down screen V2 is set in a manner in which the memory controller 122 counts the horizontal synchronizing signal pulses and the vertical synchronizing signal pulses and determines data reading timing from the field memory based on the count values.

The main control portion 117' outputs the scaled-down display control signal Se and at the same time operates the timer circuit 130 for counting. Then, after an elapse of a predetermined period (e.g., several seconds) (the step S39), the supply of the scaled-down display control signal Se is stopped (as shown in FIG. 15). As a result, the reading control circuit 122b causes the selection signal Sd to the display selection circuit 123 to be fixed at L level. Thus, the display selection circuit 123 is fixed to the first mode and accordingly the scaled-down screen is erased and only the normal image V1 as shown in (a) of FIG. 17 is displayed (the step S40).

When the memo key 128 is pressed again, switching is made in the memory selection circuit 122c in response to the memory designation signal Sc from the main control portion 117' to select the second field memory 120b. Thus, at timing of pressing the memo key 128, received video signal information is written into the second field memory 120b and, in the same manner as described above, an image based on the video signal stored in the second field memory 120b is displayed, for confirmation of the storage, as a still image V2 scaled-down to a predetermined size within the normal television screen V1.

As described above, the memory selection circuit 122c is controlled by the main control portion 117' to alternately select the first field memory 120a and the second field memory 120b for each pressing of the memo key 128 so that the video signal information is written in the selected field memory. Thus, in the first and second field memories 120a and 120b, the content of the field memory where the older video signal information has been written is erased and new video signal information is written therein.

(iv) Operation in the case of pressing the call key

Now it is assumed that the television receiver is in the normal receiving condition and that the video signal information has been written by the operation as described above in (i) and (iii). In this state, when the call key 129 of the remote control transmitter 118 is pressed, the second control signal is transmitted from the transmitter 118 through infrared rays. The main control portion 117' supplies the reading instruction signal Sb to the reading control circuit 122b in response to the second control signal (the step S50). The reading control circuit 122b is set, in response to the reading instruction signal Sb, to the second mode for reading the content of the memory at the normal reading speed. On the other hand, at the first pressing of the call key 129, the memory selection circuit 122c selects one of the field memories, where the newest video signal information has been written in response to the memory designation signal Sc from the main control signal 117'. At the second pressing of the call key, the memory selection circuit 122c selects the other field memory (see FIG. 15).

Assuming that the memory selection circuit 122c selects the first field memory 120a where the newest video signal information has been stored, the read signal R provided from the reading control circuit 122b is supplied to the first field memory through the memory selection circuit 122c. As a result, the digital video signal is read out from the first field memory 120a at the normal reading speed and it is supplied to the D/A converter 121, where it is converted to an analog video signal (the step S52). The output of the D/A converter 121 is supplied to the display selection circuit 123. The reading control circuit 122b fixes the selection signal Sd to H level while the data is being read from the field memory (as shown in FIG. 15). Thus, the display selection circuit 123 is set to the second mode for selecting analog video signal from the D/A converter 121, so that the output of the D/A converter 121 is caused to pass therethrough. As a result, the video signal information stored in the first field memory is repeatedly read out under the control of the reading control circuit 122b, whereby a still image V2' of the information in the first field memory 120a having a size equal to or smaller than that of the normal television screen the size of the still image V2' is determined (dependent on the size of an effective image stored in the field memory) is displayed on the television screen as shown in (a) of FIG. 19 or FIG. 16B (the step S53).

Subsequently, when the call key 129 is pressed for the second time, the reading control circuit 122b controls switching in the memory selection circuit 122c to select the second field memory 120b. As a result, the video signal information stored in the second field memory 120b is displayed as a still image on the screen of the CRT 116 by the same operation as described previously. Then, when the call key 129 is pressed for the third time, the reading control portion 122b fixes the selection signal Sd to L level in response to the signal Sb supplied from the main control portion 117' to the reading control circuit 122b and supplies it to the display selection circuit 123. Thus, the display selection circuit 123 is set to the first mode for selecting the luminance signal supplied from the luminance signal processing circuit 113. As a result, the display screen of the CRT 116 is returned to the initial state where a normal image being broadcast is displayed.

In the above described embodiment, the two field memories are used and either of them is selected in response to H level or L level of the control signal Sc, whereby the field memories can be successively accessed. However, if three or more field memories are provided in that construction, it might become difficult to always rewrite older image information by the newest image information by successive accessing. Therefore, the following description is made of a construction which always enables successive accessing of the field memories irrespective of the number of field memories.

Figure 20:
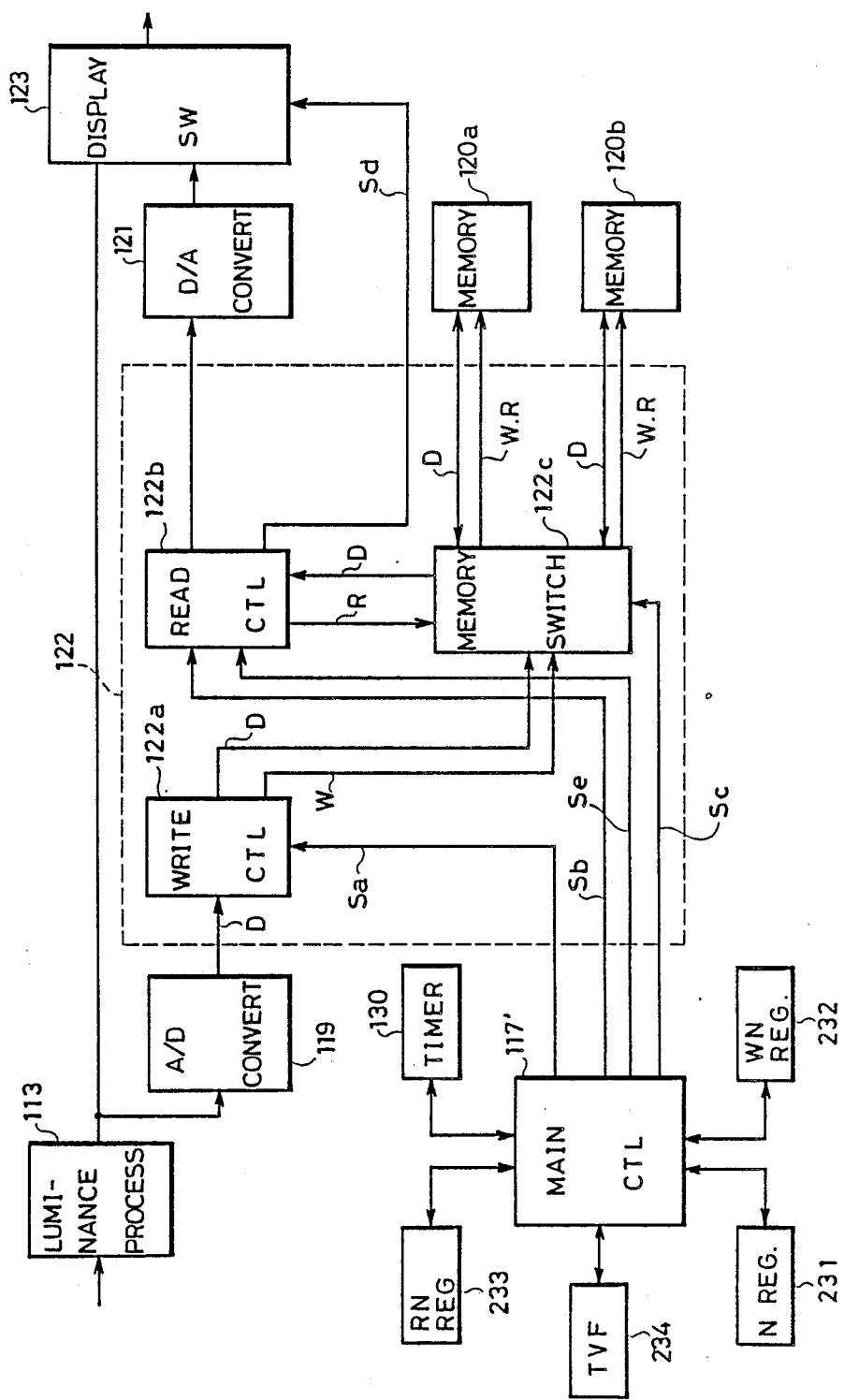
FIG. 20 shows a construction of a main portion of a television receiver according to another embodiment of the present invention.

FIG. 20 is a diagram showing a construction of a main portion of a digital television receiver according to another embodiment of the present invention. In FIG. 20, components corresponding to those in FIG. 11 are denoted by the same reference numerals.

Figure 21A:
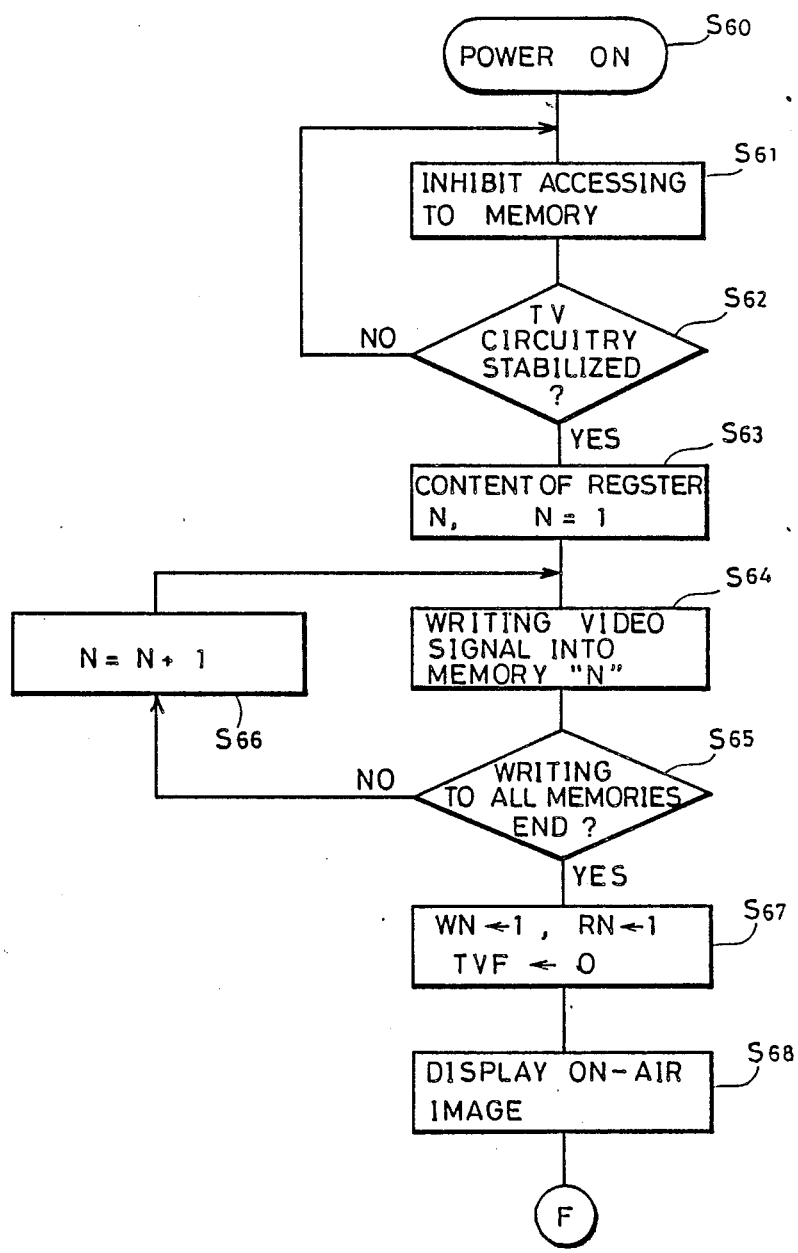
FIGS. 21A and 21B show operation of the digital television receiver of the embodiment shown in FIG. 20.
Figure 21B:
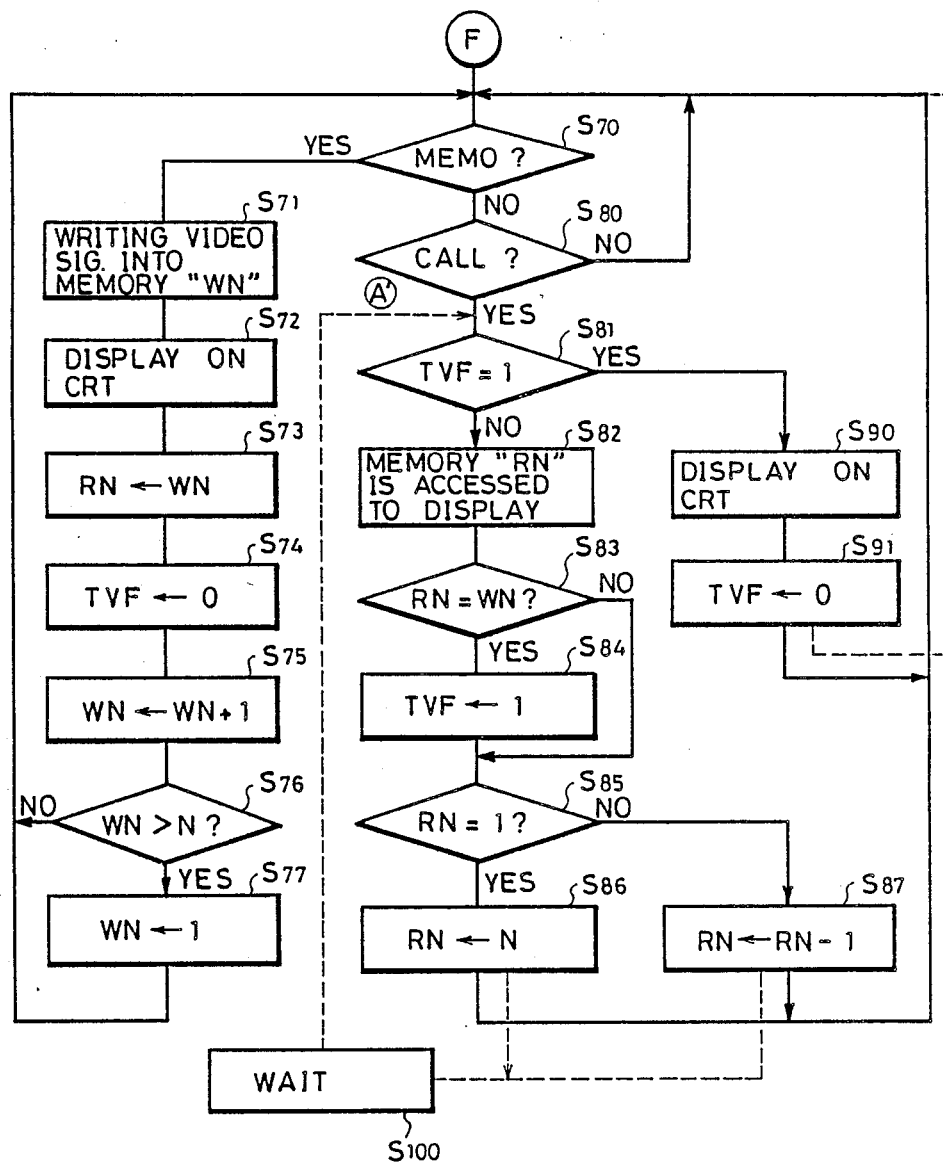

Referring to FIG. 20, in order to successively access a plurality of field memories (two field memories being shown in FIG. 20 by way of example) 120a and 120b, there are provided an N register 231 for storing the number of field memories, a WN register 232 for storing a number of the field memory into which data is to be written, an RN register 233 for storing a number of the field memory from which data is to be read out, and a flag TVF 234 indicating whether display on the television screen is to be made or not. Although the N register 231, the WN register 232, the RN register 233, the flag TVF 234, the timer circuit 130 and the main control portion 117' are represented as being formed by hardware in the drawing, they are actually formed by a program in the microcomputer 117. Referring now to FIGS. 21A and 21B as the operation flowcharts, operation of the embodiment shown in FIG. 20 will be described. Since operation for writing data into and reading data from the field memories is the same as in the previously described embodiment, the following description is mainly made of operation related to designation of an accessing order for the field memories.

(i) Initialization

When power supply voltage becomes stable after turn-on of the power supply, writing of initial screen information into all of the field memory is performed (the steps S60 to S65). This writing of the video signal data into all of the field memories is performed successively based on the information on the number of field memories stored in the N register 231. After completion of the writing of the initial data into all of the field memories, the contents of the WN register 232 and the RN register 233 are set to 1. Thus, the first field memory 120a is designated as the field memory to be accessed next. In addition, since display of a still image is not made on the screen, the flag TVF 234 is set to 0 (the step S67). As a result, the initialization sequence of the field memories is completed and an image currently received is displayed on the display screen of the receiver.

(ii) Operation in the case of pressing the memo key

When the memo key 128 of the remote control transmitter 118 (as shown in FIG. 12) is pressed, the first control signal for instructing image storage is supplied to the microcomputer 117. The main control portion 117' examines the value stored in the WN register 232 and selects the corresponding field memory (the first field memory 120a since the value of the WN register 232 is 1 in this case) and then it supplies the memory selection signal Sc to the memory selection circuit 122c. Thus, the video signal (the luminance signal) from the A/D converter 119 is written into the first field memory 120a through the writing control circuit 122a and the memory selection circuit 122c (the step S71). When the writing is completed, a scaled-down screen for confirmation of the writing is displayed for a predetermined period and then the television screen returns to the normal display (the step S72). Then, the content of the WN register 232 is transferred to the RN register 233, so that the content of the RN register 233 becomes 1 (the step S73). The flag TVF 234 indicating whether or not display is given on the screen becomes 0 (the step S74). Further, 1 is added to the content of the WN register 232 and thus the content of the WN register 232 becomes 2 (the step S75). The content of the WN register 232 is compared with the value of the N register 231 which stores the number of field memories (the step S76). In this case (in which the memo key 128 is pressed for the first time), the content of the WN register 232 is equal to the content of the N register 231 (in the case of N=2) and accordingly the operation flow returns to the step S70, where the receiver is ready for the next pressing of the memo key 128.

When the memo key 128 is pressed again, the video signal is written in the second field memory 120b since the content of the WN register 232 is 2 as a result of the previous operation. In the same manner as described above, a scaled-down screen is displayed and then the content of the WN register 232 is transferred to the RN register 233 so that the content of the RN register 233 becomes 2, while the flag TVF 234 is reset to 0. Further, 1 is added to the content of the WN register 232 so that the content of the WN register 232 becomes 3 (the steps S70 to S75). Then, the content of the WN register 232 is compared with the content of the N register 231 (the step S76). Since the content of the WN register 232 is 3, which is larger than 2 of the content of the N register 231, the content of the WN register 232 is set to 1 (the step S77). Subsequently, the same operation is repeated. As a result, one operation of the memo key 128 enables the oldest information to be erased and the newest video signal information to be written in the field memory where the oldest information has been written. Thus, the newest video signal information can be written in the field memory having the oldest video signal information without taking any account of the writing order of the field memories and it is made possible to realize a memorandum function having excellent operability.

(iii) Operation in the case of pressing the call key

When the call key 129 is pressed, the second control signal for instructing reproduction of the stored video signal information is supplied to the microcomputer 117 (the step S80). The main control portion 117' determines in response to the second control signal whether the flag TVF 234 is set to 1 or not (the step S81). If the flag TVF 234 is 1, reproduction of a still image is not performed and only an image currently received is displayed (the step S90). If the value of the flag TVF 234 is 0, the normal television screen is not effected and the screen display is set to the second mode display for reproducing a still image based on the video signal information stored in the field memory. If the content of the RN register 233 is 2, the second field memory 120b is selected and the content thereof (the newest written video signal information) is displayed as a still image on the screen of the CRT 116 (the step S82). Since the content of the WN register 232 is 1 if the content of the RN register 233 is 2, a relation of RN≠WN is determined (the step S83) and a relation RN≠1 (RN being the content of the RN register 233) is determined (the step S85). Accordingly, the content of the RN register 233 becomes 1 (the step S87) and the first field memory 120a is designated as the field memory where video signal information to be read out next is stored.

When the call key 129 is pressed again in this state, the content written in the first field memory 120a (which is image information older than the information written in the second field memory 120b) is displayed as a still image on the television screen since the flag TVF 234 is 0 and the content of the RN register 233 is 1 (the step S82). Then, the content of the RN register 233 is compared with the content of the WN register 232 (the step S83). Since RN=WN=1 this time, the flag TVF 234 is set to 1. In addition, since the content of the RN register 233 is 1 indicating that the oldest image information is read out, the number N (2 in this case) of the field memory from which information is to be read out next is written in the RN register 233 (the step S86).

Then, when the call key 129 is pressed again, the content of the field memory is not read out since the flag TVF 234 is 1, and a normal image currently received is displayed on the screen of the CRT 116 (the step S90). Then, the value of the TVF 234 is reset to 0, whereby the receiver is ready for the next pressing of the call key 129.

As described above, each time the call key 129 is pressed, the different stored image information is in turn reproduced as a still image and when a cycle of reading from the field memories is completed, the normal display is made on the television screen. Consequently, a desired still image can be reproduced with good operability only by pressing of a single call key 129 without taking account of the order of writing in the field memories.

In the above described embodiment, a still image is reproduced successively by pressing of the call key 129. However, a memo scan switch may be individually provided in the main body of the television receiver or the remote control transmitter 118 so that a still image can be successively reproduced by pressing of the memo scan switch. In this case, a sequence of display described below is repeated. First the content of the field memory where the newest video signal information has been written is reproduced and then the content of the field memory where the newer information has been written is reproduced and, after a cycle of reproduction of the contents of the field memories, a normal image is displayed. This construction is convenient and advantageous for demonstration of television receivers at stores or the like.

Input of the memo scan switch occurs at the step A' after the step S80 in the operation flowchart of FIG. 21B and as shown by the broken lines the flow from the step S86 or the step S87 proceeds to the step S100, where there is a wait for a predetermined period (e.g., several seconds) and the content to be displayed is automatically displayed for the predetermined period. After the contents of all of the field memories have been displayed, a television image currently received is displayed.

The above described construction makes it possible to reproduce a desired television image as a still image as required. However, if a scaled-down screen is displayed, it may happen that boundaries between the scaled-down screen and the normal screen become unclear, causing lowering of visual distinguishability or making it difficult to distinguish the reproduced still image from the normal television image (currently received image).

Therefore, another construction as described below is adopted in which a bordering is provided around a still image to improve visibility and identifiability of the reproduced still image.

Figure 22:
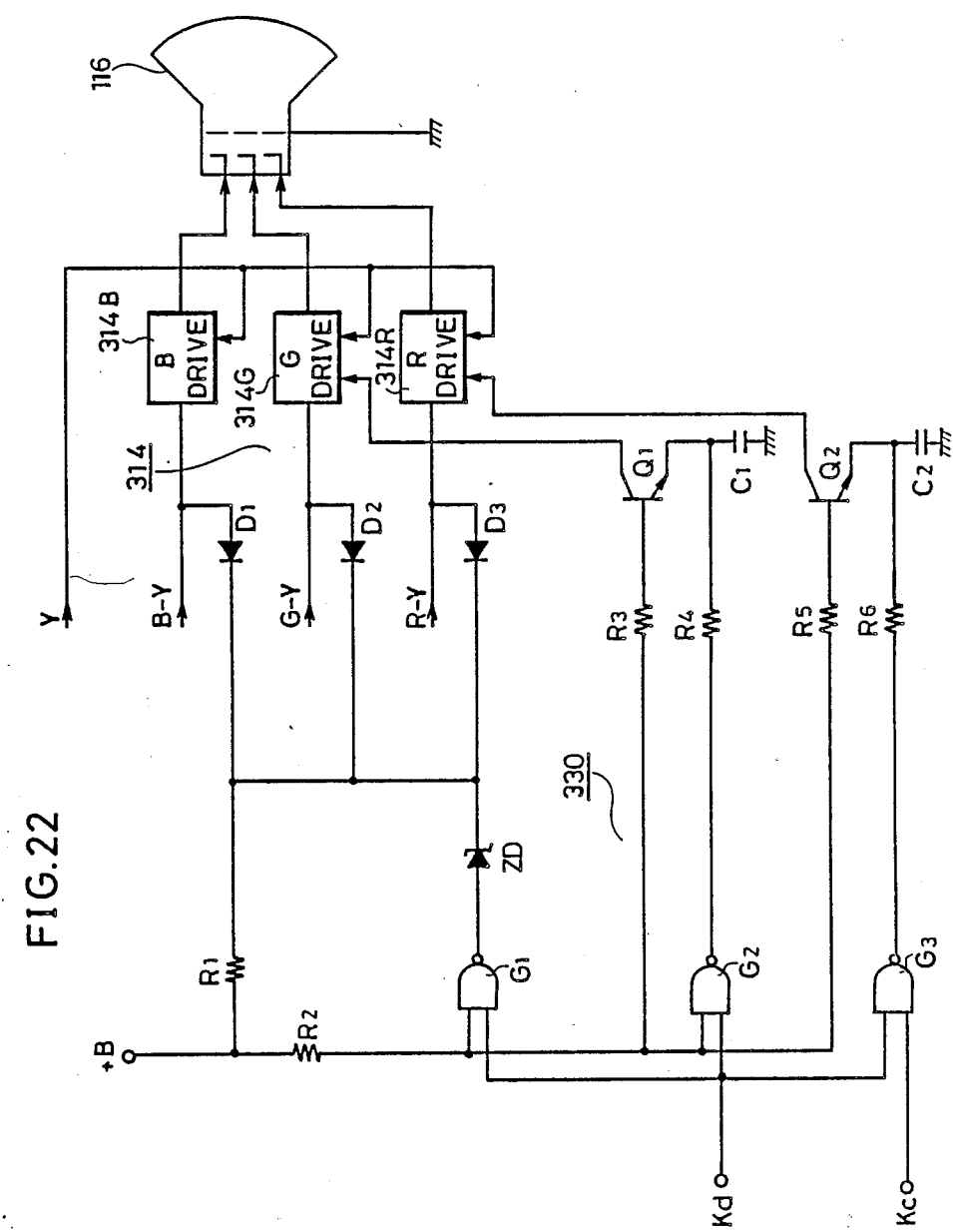
FIG. 22 shows a main portion of a digital television receiver according to a further embodiment of the present invention.

FIG. 22 shows a circuit construction for bordering a still image.

Referring to FIG. 22, a bordering signal addition circuit 330 and a color drive circuit 314 are shown.

The color drive circuit 314 corresponds to a color matrix circuit 114 and the video amplifier 115 in FIG. 11. The color drive circuit 114 comprises a B drive circuit 314B for receiving a luminance signal Y and a color-difference signal B−Y and providing a B (blue) signal, a G drive circuit 314G for receiving the luminance signal Y and a color-difference signal G−Y and providing a G (green) signal, and an R drive circuit 314R for receiving the luminance signal Y and a color-difference signal R−Y and providing an R (red) signal.

An output of each of the drive circuits 314G, 314R and 314B is supplied to a cathode of the CRT 116.

The bordering signal addition circuit 330 comprises a NAND gate G1 responsive to a bordering display signal Kd for clamping the color-difference signal levels applied to the respective drive circuits 314B, 314G and 314R to fixed levels, a NAND gate G2 responsive to the bordering display signal Kd for disabling the G drive circuit 314G, and a NAND gate G3 responsive to the bordering display signal Kd and a bordering color signal Kc for disabling the R drive circuit 314R.

A Zener diode ZD to be turned on at L level of an output of the NAND gate G1 and a reverse current blocking diode D1 to be turned on in response to the turn-on of the Zener diode ZD are provided between the NAND gate G1 and a color-difference signal input portion of the B drive circuit 314B.

Similarly, the Zener diode ZD and reverse current blocking diodes D2 and D3 are provided between the NAND gate G1 and the respective color-difference signal input portions of the G drive circuit 314G and the R drive circuit 314R, respectively.

An interconnection between the Zener diode ZD and each of the diodes D1, D2 and D3 is connected with an end of a voltage drop resistor R1. The other end of the resistor R1 is connected to a power supply +B (about 12 V).

The bordering signal addition circuit 330 further comprises a switching transistor Q1 to be turned on in response to an L level output of the NAND gate G2 for disabling the G drive circuit 314G, and a switching transistor Q2 to be turned on in response to an L level output of the NAND gate G3 for disabling the R drive circuit 314R.

The switching transistor Q1 has a base (a control electrode) connected to the power supply +B through resistors R2 and R3. The switching transistor Q1 has an emitter connected to an output portion of the NAND gate G2 through a resistor R4 and also connected to a ground potential through a capacitance C1.

The switching transistor Q2 has a base connected to the power supply +B through resistors R5 and R2. The switching transistor Q2 has its emitter connected to an output portion of the NAND gate G3 through a resistor R6 and also connected to the ground potential through a capacitance C2.

Collectors of the switching transistors Q1 and Q2 are connected to control inputs of the G drive circuit 314G and the R drive circuit 314R, respectively.

The bordering display signal Kd and the bordering color signal Kc are generated from the reading control circuit 122b and the main control portion 117', respectively, as shown in FIG. 13.

Description is now made of display operation for a still image provided with bordering. In the following description, operation for writing data into and reading data from the memories is also the same as in the above described embodiments.

(i) Operation in the case of pressing the memo key

When the memo key 129 is pressed, video signal information is written into either of the field memories 120a and 120b in the same manner as in the above described embodiments. After completion of the writing of the information, a scaled-down display control signal Se is raised to H level for a predetermined period for confirmation and it is supplied to the reading control circuit 122b. Thus, a scaled-down screen is displayed on the television screen.

At this time, the bordering color signal Kc from the main control portion 117' is at L level. On the other hand, the bordering display signal Kd which is raised to H level for a predetermined period immediately before and after reading of data from the field memory is generated from the reading control circuit 122b in the horizontal time direction and the vertical time direction. The timing for generating the signal Kd is set by counting of a predetermined number of horizontal synchronizing signal pulses and a predetermined number of vertical synchronizing signal pulses. As a result, the outputs of the first and second NAND gates G1 and G2 shown in FIG. 22 are at L level in the period of H level of the bordering display signal Kd, while the output of the third NAND gate G3 is at H level in that period. When the output of the first NAND gate G1 falls to L level, the Zener diode ZD is turned on and accordingly all the diodes D1 to D3 are turned on. As a result, the levels of the color-difference signals B−Y, G−Y and R−Y supplied from the display selection circuit 123 to the color drive circuit 314 are clamped at a predetermined potential (which is equal to a sum of a forward voltage drop of the diodes and a backward voltage drop of the Zener diodes).

Figure 23A:
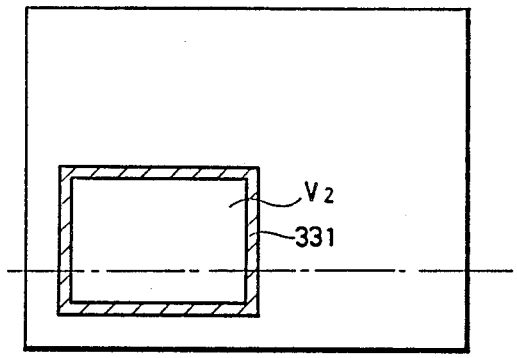
FIG. 23A and 23B show examples of display on the television screen in the case of operating the receiver shown in FIG. 22.

On the other hand, in the bordering signal addition circuit 330, the switching transistor Q1 is turned on because of L level of the output of the NAND gate G2 and the switching transistor Q2 is turned off because of H level of the output of the NAND gate G3. As a result, the G drive circuit 314G is disabled and the output thereof falls to L level. The B drive circuit 314B and the R drive circuit 314R provide signals of an output level (H level) corresponding to the clamped color-difference signal level. As a result, as shown in FIG. 23A, a scaled-down still image V2 provided with a green bordering 331 is displayed on the television screen in a third still image display mode (i.e., the scaled-down screen display mode for confirmation).

(ii) Operation in the case of pressing the call key

Figure 23B:
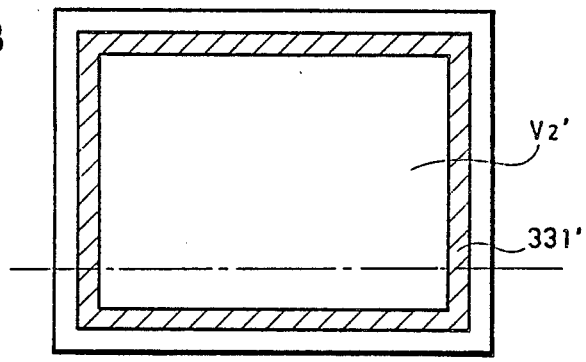

As described above, the main control portion 117' generates a memory designation signal Sc in response to pressing of the call key 129. The main control portion 117' raises the bordering color signal Kc to H level only when the memory designation signal Sc is generated in response to every second operation of the call key 129, and it lowers the signal Kc to L level in other cases (if the number of field memories is two). On the other hand, the reading control circuit 122b generates the bordering display signal Kd which is raised to H level only in a predetermined period immediately before and after reading of data from the field memory, in the same manner as in the above described case of the third still image display mode, except that a time length of the bordering display signal Kd is set to a value twice larger than that in the third still image display mode in both of the horizontal and vertical directions. Accordingly, when the call key 129 is pressed for the first time, that is, when the newer video signal information out of the video signals of two fields of the field memories 120a and 120b is read out, the output of the G drive circuit 314G shown in FIG. 22 is lowered to L level in a period of H level of the bordering display signal Kd in the same manner as in the case of the second still image display mode, whereby a still image V2' provided with a green thick bordering 331' is displayed on the screen in the third still image display mode as shown in FIG. 23B.

When the call key 129 is pressed for the second time, that is, when the older video signal information is read out, the bordering color signal Kc is raised to H level. Accordingly, the outputs of the NAND gates G1 to G3 are all at L level in the period of H level of the bordering display signal Kd and the switching transistors Q1 and Q2 are both in the on state. As a result, the outputs of the G drive circuit 314G and the R drive circuit 314R are both lowered to L level and a still image provided with a yellow thick bordering 331' is displayed on the screen on the CRT 116.

Thus, the bordering of a predetermined color around the reproduced still image as described above makes it possible to confirm at sight that the video signal information read out from the field memory is being reproduced.

In addition, a width of the bordering 331 of the confirmation screen (the scaled-down reproduced still image screen) V2 is made smaller than that of the bordering 331' of the reproduced still image screen V2' and thus each reproduced still image screen has good balance with its bordering. Particularly, the thin bordering 331 of the confirmation screen V2 causes little disturbance to observation of the image on the normal screen.

In addition, by using different colors for the bordering around the reproduced still image V2 in the case of displaying the newer video signal information and in the case of displaying the older video signal information, it is made possible to visibly determine at once whether the newer video signal information is displayed or the older video signal information is displayed.

Figure 24:
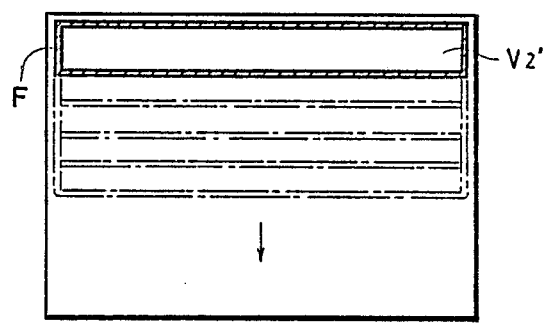
FIG. 24 shows an example of display on a television screen in a still further embodiment of the present invention.

Furthermore, at the time of displaying the still image V2', an area surrounded by a bordering F may gradually extend from an upper portion to a lower portion of the screen of the receiver as shown by chained lines in FIG. 24 so that the entire still image V2' can be displayed finally. This can be realized by suitably incrementing row addresses for the field memory by appropriate value for each field cycle.

Although the operation for storing and reproducing image information was described in the foregoing, construction of the field memories was not described above in detail. Therefore, description is now made of the construction of the field memories.

If image data stored in a field memory is to be displayed on the screen of the receiver, the below described problems are involved in the third still image display mode for displaying a scaled-down image for confirmation compared with the case of the second still image display mode (the normal display screen) for displaying an image with a normal size of the television screen.

It is assumed hereinafter as to the screen for display of data read out from the field memory that a horizontal scanning period is 63 $\mu$sec. with 256 pixels on one horizontal scanning line on the normal display screen and that a horizontal scanning period is 30 $\mu$sec. with 256 pixels on one horizontal scanning line on the scaled-down display screen. In this case, it is necessary on the scaled-down display screen to read out data of the same number of pixels as that on the normal display screen at a speed about twice higher than that on the normal display screen. More specifically stated, assuming that data of one pixel is read out from a field memory by one accessing, the reading speed from the memory on the normal display screen is 180 nsec./pixel, while that on the scaled-down display screen is 90 nsec./pixel. Reading of data at such a high speed as 90 nsec./pixel cannot be performed by a general-purpose DRAM (dynamic random access memory), which effects only normal mode operation.

In order to solve the above described problems, the following methods may be considered.

1. Two pixel data are read out by one accessing. However, this method has a disadvantage that two DRAMs are required.

Figure 1:
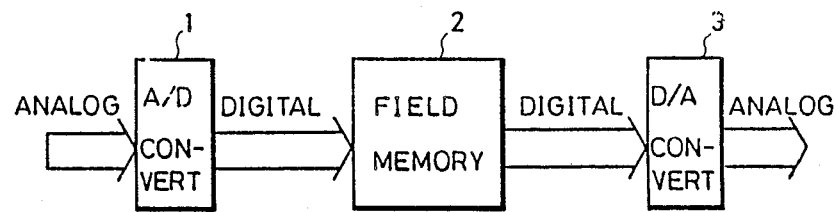
FIG. 1 shows a flow of data in data processing using a typical field memory.
Figure 2:
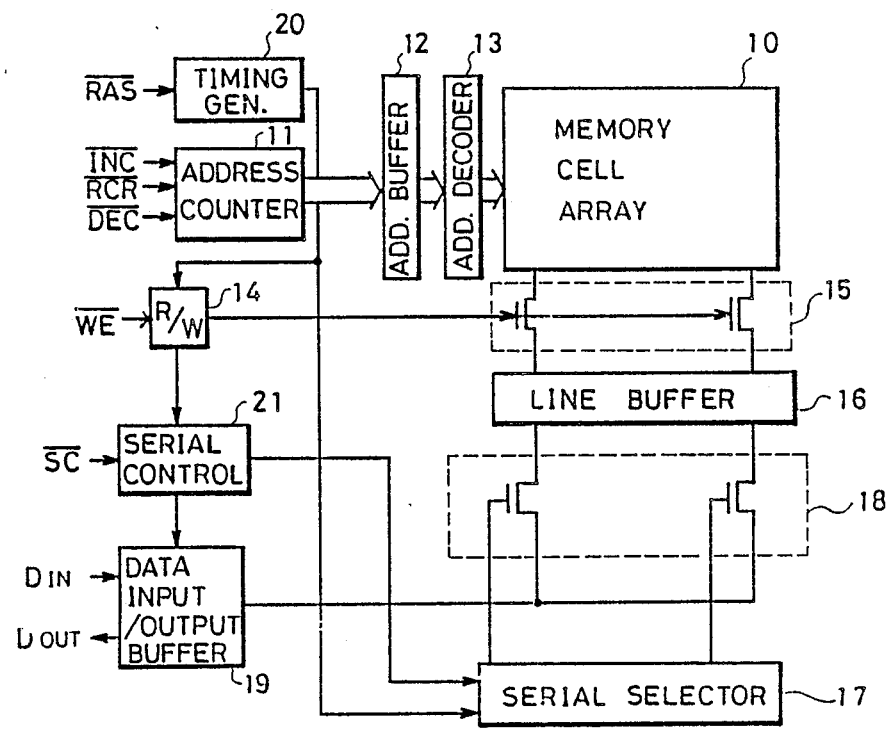
FIG. 2 shows an example of construction of a typical field memory.
Figure 3:
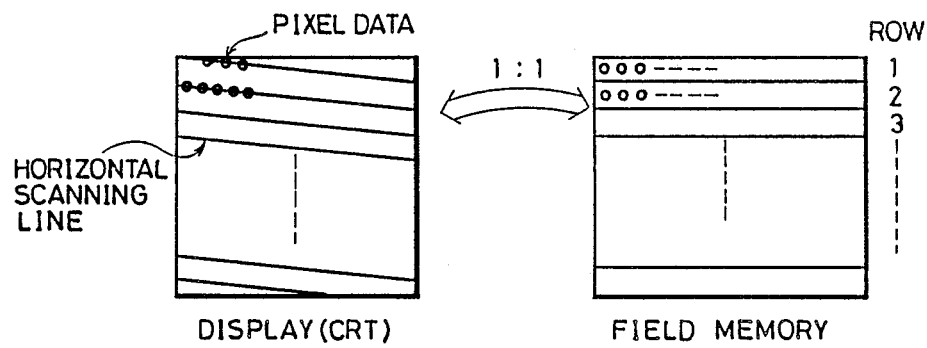
FIG. 3 shows a relation between data stored in a field memory and pixel data on a television screen.
Figure 4:
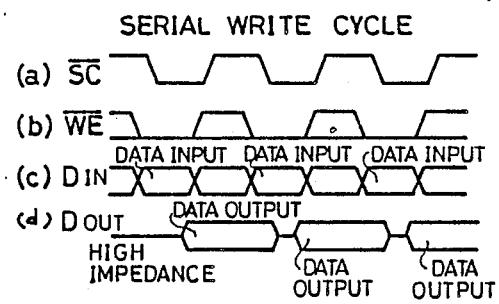
FIG. 4 is a waveform diagram showing serial writing operation in a field memory.
Figure 5:
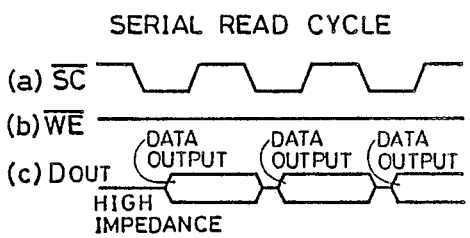
FIG. 5 is a waveform diagram showing serial reading operation of a field memory.
Figure 6:
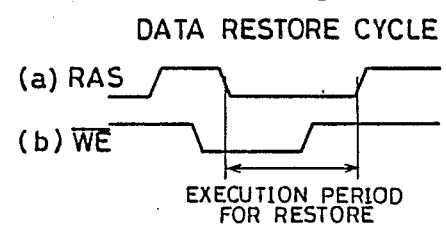
FIG. 6 is a waveform diagram showing data storing operation of a field memory.
Figure 7:
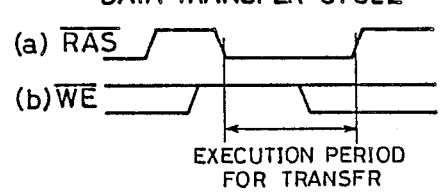
FIG. 7 is a waveform diagram showing data transfer operation of a field memory.
Figure 8:
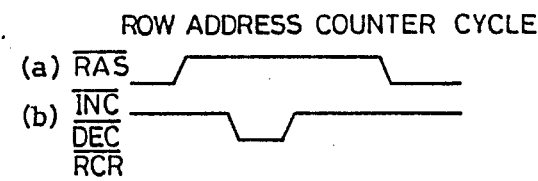
FIG. 8 is a waveform diagram showing a row address generating operation in a field memory.
Figure 9:
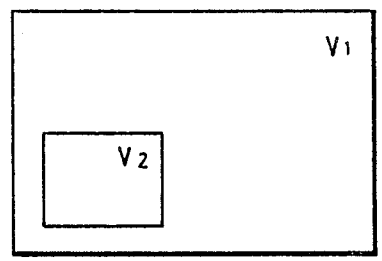
FIG. 9 illustrates a picture-in-picture function in a conventional digital television receiver.
Figure 10:
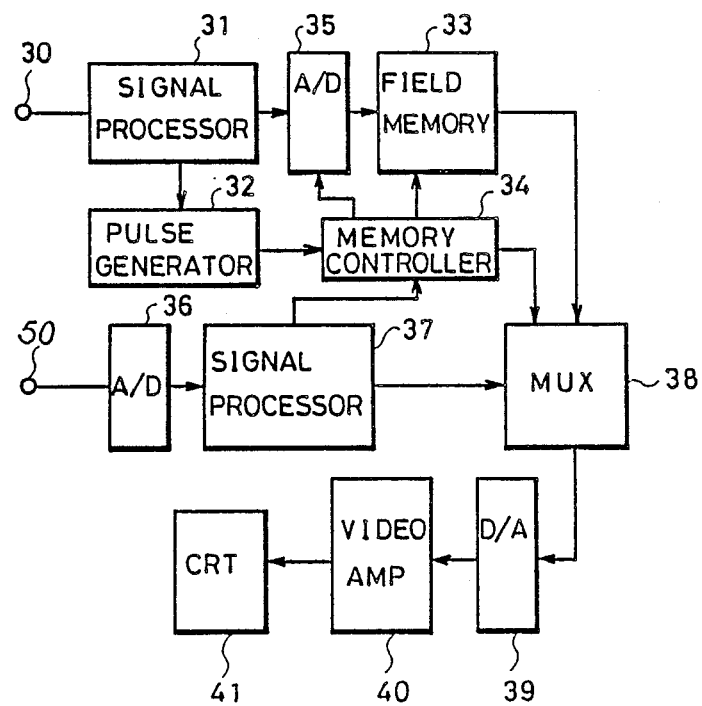
FIG. 10 is a schematic block diagram showing a construction of a conventional digital television receiver using a field memory.

2. A high-speed static RAM or a high-speed serial input/output type DRAM as described above (as shown in FIG. 2) is used. Those RAMs are very expensive and increase of cost cannot be avoided.

3. A page mode of a DRAM is used. Generally, a DRAM has a construction as shown FIG. 25A. The DRAM in FIG. 25A is for example a 256K bit DRAM-$\mu$PD41464 of NEC Corporation.

Figure 25A:
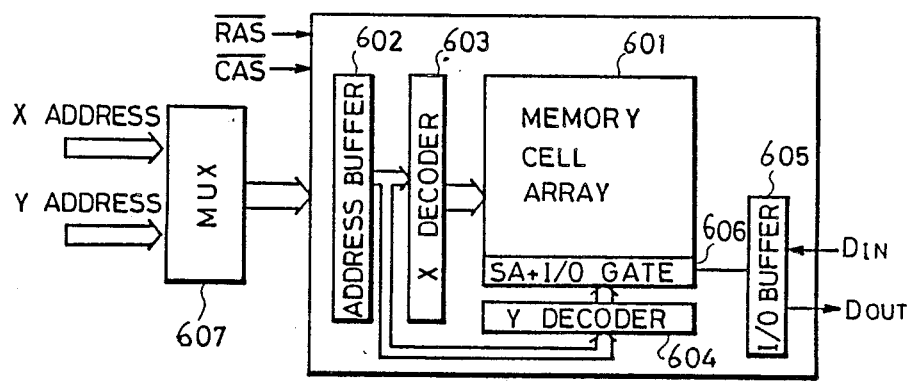
FIG. 25A shows a schematic construction of a conventional dynamic random access memory capable of performing high-speed serial access mode operation.

Referring to FIG. 25A, the DRAM comprises a memory cell array 601 in which a plurality of memory cells are arrayed in rows and in columns, an address buffer 602 for receiving an X (row) address and a Y (column) address externally supplied, an X decoder 603 for decoding an X address from the address buffer 602 and selecting a row of the memory cell array 601, and a Y decoder 604 for decoding a Y address from the address buffer 602 and selecting a column of the memory cell array 601. In order to input and output data, there are provided an input/output buffer 605 for communicating data with an external portion, a sense amplifier SA for amplifying and latching data on each column of the data of the memory cell array 601, and an I/O gate for connecting a column of the memory cell array 601 to the I/O buffer 605 in response to an output of the Y decoder 604. In FIG. 25A, the sense amplifier SA and the I/O gate are represented as being included in one block 606.

The X address and the Y address are multiplexed and supplied to the address buffer 602 through a multiplexer 607.

A signal $\overline{RAS}$ is applied to define an active period of a memory cycle and a timing for receiving the X address.

A signal $\overline{CAS}$ is applied to define a timing for receiving the Y address. More specifically, after a row address is supplied to the address buffer 602 through the multiplexer 607, the signal $\overline{RAS}$ is lowered to L level, whereby the row address is specified. In addition, after a column address is supplied to the address buffer 602 through the multiplexer 607, the signal $\overline{CAS}$ is lowered to L level, whereby the column address is specified. Thus, a memory cell to be accessed is designated.

Apart from such a general memory accessing method, a high-speed serial access mode called the page mode is provided in the DRAM.

Figure 25B:
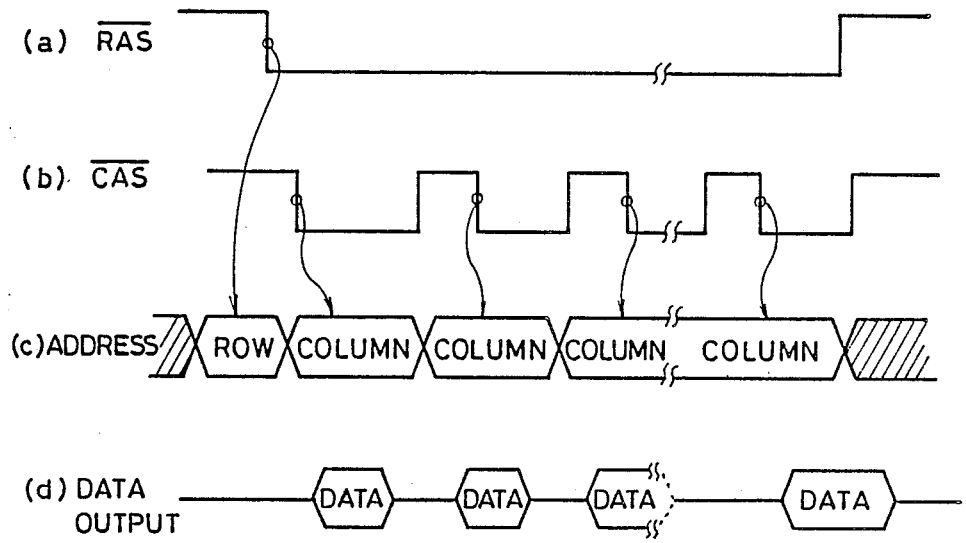
FIG. 25B is a waveform diagram showing page mode operation of a conventional dynamic random access memory.

Operation in this page mode is performed in the following manner. As shown in FIG. 25B, once a row address is entered and the signal $\overline{RAS}$ is held at L level for a predetermined period, the signal $\overline{CAS}$ is toggled continuously in this predetermined period, whereby a new column address is accepted for each toggle of the signal $\overline{CAS}$ to access a memory cell. Accordingly, memory cells connected to a row selected by a row address can be accessed at a speed about twice higher than that in the normal operation mode because only column addresses are changed for accessing.

However, a generally used DRAM is a volatile storage device and it is necessary to refresh information in the memory cells periodically. Consequently, the signal $\overline{RAS}$ cannot be held continuously at L level in the active state for more than, for example, 10 $\mu$sec.

Figure 26:
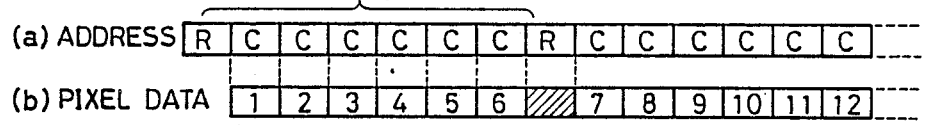
FIG. 26 is an illustration for explaining a problem in the case of using a conventional dynamic random access memory as a field memory.

Therefore, in order to continuously apply the page mode for more than 10 μsec. as in the case of displaying the scaled-down screen having a horizontal period 30 μsec., it is necessary to raise the signal $\overline{RAS}$ at H level at first and then to strobe the row address again, as shown in FIG. 26.

However, in that case, when the signal $\overline{RAS}$ attains H level, the memory cycle is completed and memory cell data cannot be read out (as shown by a hatched portion in (d) of FIG. 26). As a result, pixel data cannot be read out continuously from the DRAM and some pixels are missing on the reproduced screen and thus a complete still image cannot be reproduced. In the page mode writing mode, the same problem occurs. Therefore, the following description of a construction of a data processing circuit which does not cause any missing of data even if writing and reading of data are performed in the page mode.

Figure 27:
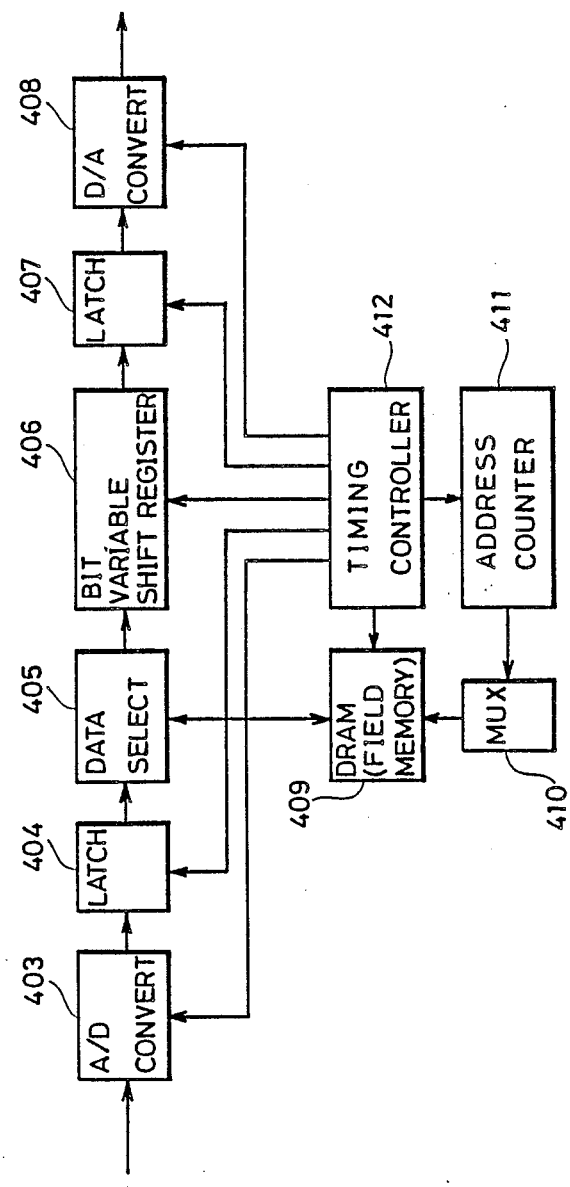
FIG. 27 shows a construction of a main portion of a digital television receiver according to a still further embodiment of the invention.

Referring to FIG. 27, an A/D converter 403 converts an input video signal (having a predetermined baseband) to 4-bit serial data. A latch circuit 404 converts the 4-bit serial data from the A/D converter 403 to 8-bit parallel data. A data selector 405 writes the 8-bit parallel data from the latch circuit 404 into a DRAM (a field memory) 409 and reads out the 8-bit parallel data from the DRAM. In this construction, data of one pixel is stored in the form of 8 bits in the DRAM 409. Thus, it becomes possible to store and reproduce pixel data with little error. A bit variable shift register 406 converts a discontinuous data stream from a data selector 405 to a continuous data stream (in the case of reading in the page mode). A latch circuit 407 converts 8-bit parallel data from the bit variable shift register 406 to 4-bit serial data. A D/A converter 408 converts the 4-bit serial data from the latch circuit 407 to an analog signal. An address counter 411 generates information of an address to be accessed in the field memory 409. A multiplexer 410 multiplexes and supplies the address from the address counter 411 to the DRAM 409. Operation timing for the above described respective circuits is applied by a timing controller 412.

In order to store a video signal currently received, the data latched in the latch circuit 404 is written in the DRAM 409 at a normal speed in a writing cycle of the normal operation mode through the data selector 405 by operation of the timing controller 412, the address counter 411 and the multiplexer 410.

If the data stored in the DRAM 409 is to be read out to reproduce a normal image, the data is read out from the DRAM 409 at a reading cycle of the normal operation mode.

In order to reproduce a scaled-down image for confirmation of written data after the writing of data into the DRAM 409, it is necessary to read out the data at a speed about twice higher than that in the normal reading mode. Therefore, the reading of data from the DRAM 409 is performed in the page mode by the timing controller 412.

The data read out in the page mode is supplied to the bit variable shift register 406 through the data selector 405. Although the data stream from the data selector 405 is discontinuous due to the application of the page mode for a long period (for example, more than 10 μsec.), this discontinuous data stream is converted to continuous data stream by a bit variable shift register 406. The bit variable shift register 406 has a construction shown in FIG. 28.

Figure 28:
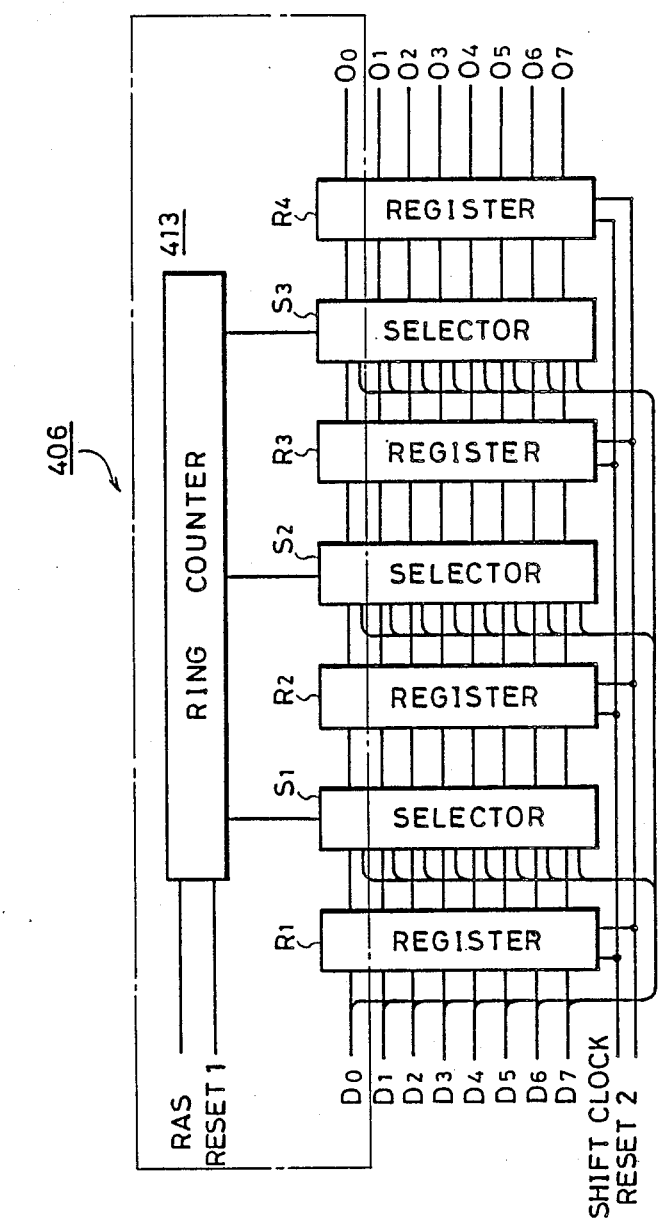
FIG. 28 shows a main portion of the construction shown in FIG. 27.

Referring to FIG. 28, the bit variable shift register 06 comprises a ring counter 413 for receiving a signal RAS from the timing controller 412 and a reset signal RESET 1, data registers R1, R2, R3 and R4 for latching and transferring data in response to a shiftclock SHIFT-CLOCK and, selectors S1, S2 and S3 for adjusting the number of stages of the shift register in response to a signal from the ring counter 413. The registers R1 to R4 are set by a reset signal RESET 2.

Input data D0 to D7 are supplied to the register R1 and the selectors S1 to S3. The register R2 receives the data from the selector S1. The register R3 receives the data from the selector S2. The register R4 receives the data from the selector S3 and provides output data 01 to 07.

The ring counter 413 disables the selectors successively each time the signal RAS is brought into a non-active state (L level).

The reset signals RESET 1 and RESET 2 are horizontal synchronizing signals obtained in the television receiver.

The shiftclock signal SHIFTCLOCK defines a speed of reading data from the DRAM 409 and a speed of transferring data therethrough.

A signal $\overline{CAS}$ for applying strobe timing for column addresses and timing for reading data from and writing data into the DRAM 409 is produced by the shiftclock SHIFTCLOCK.

A cycle of the shiftclock SHIFTCLOCK is equal to the non-active period (the period of L level) of the signal RAS.

The signal $\overline{CAS}$ synchronizes with the shiftclock SHIFTCLOCK in phase. However, it is at H level in the period of L level of the signal RAS.

Figure 29:
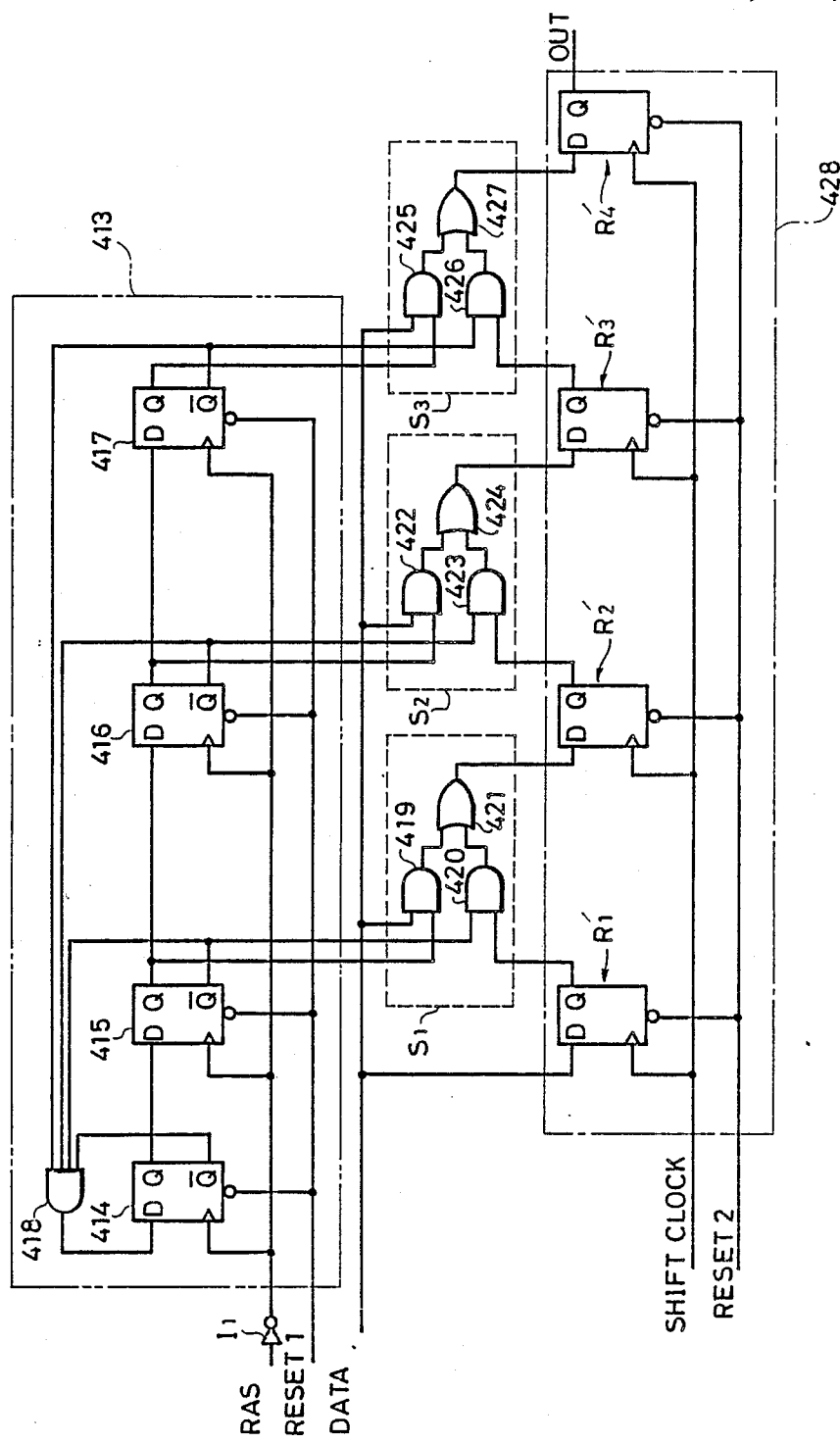
FIG. 29 is a logic diagram showing the construction in FIG. 28 in more detail.

Now, description is made of a more detailed construction of the block surrounded by the chained lines in FIG. 28, with reference to FIG. 29.

Referring to FIG. 29, the ring counter 413 comprises four stages of D-flip-flops 414, 415, 416 and 417. Each of the D-flip-flops 414 to 417 receives a signal through an inverter I1 of the signal RAS (i.e., the signal $\overline{RAS}$) at its clock input and receives the reset signal RESET 1 at its reset input.

Each of the D-flip-flops 415 to 417 receives at its D input a Q output of the D-flip-flop of the preceding stage. The D-flip-flop 414 receives at its D input an output through an AND gate 418 of a $\overline{Q}$ output of each of the D-flip-flops 414 to 417.

Each of the D-flip-flops 414 to 417 outputs the signal of the D input from its Q output at a fall of the signal RAS and it is reset in response to the fall of the reset signal RESET 1.

A shift register 428 for one bit comprises four stages of D-flip-flops R1', R2', R3' and R4'. Selectors S1 to S3 are interposed between the respective adjacent flip-flops R1' to R4'.

The selectors S1 to S3 each have the same construction and comprise two AND gates and an OR gate. More specifically, the selector S1 comprises an AND gate 419 for receiving data DATA and the Q output of the D-flip-flop 415, an AND gate 420 for receiving the Q output of the D-flip-flop R1' and the $\overline{Q}$ output of the D-flip-flop 415, and an OR gate 421 for receiving outputs of the AND gates 419 and 420. An output of the OR gate 421 is supplied to the D input of the D-flip-flop R2'.

The selector S2 comprises an AND gate 422 for receiving data DATA and the Q output of the D-flip-flop 416, an AND gate 423 for receiving the Q output of the D-flip-flop R2' and the $\overline{Q}$ output of the D-flip-flop 416, and an OR gate 424 for receiving outputs of the AND gates 422 and 423. An output of the OR gate 424 is supplied to the D input of the D-flip-flop R3'.

The selector S3 comprises an AND gate 425 for receiving data DATA and the Q output of the D-flip-flop 417, an AND gate 426 for receiving the $\overline{Q}$ output of the D-flip-flop 417 and the Q output of the D-flip-flop R3', and an OR gate 427 for receiving outputs of the AND gates 425 and 426. An output of the OR gate 427 is supplied to the D input of the D-flip-flop R4'.

Figure 30:
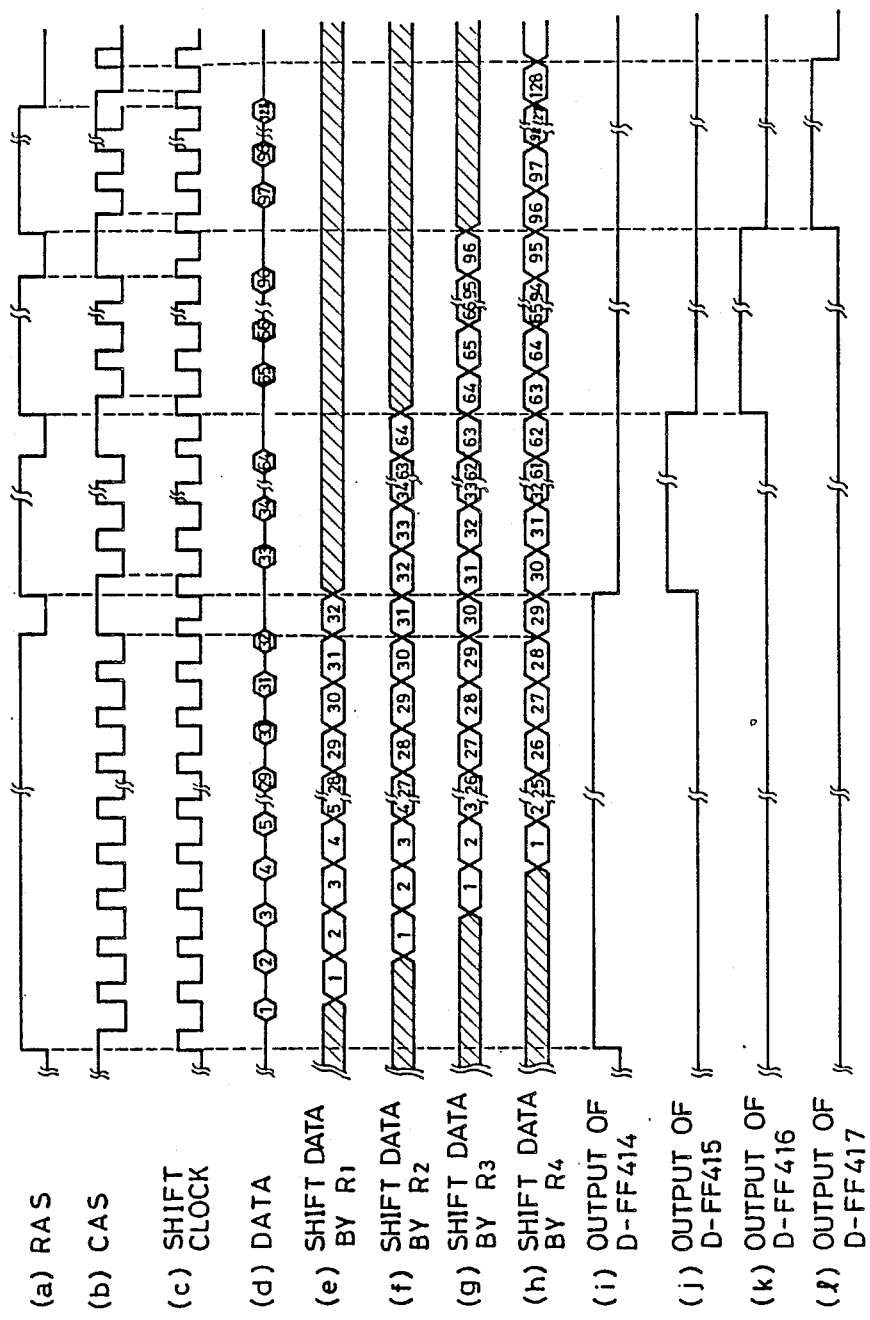
FIG. 30 shows operation of a data processor shown in FIG. 29.

Referring now to FIG. 30 showing an operation waveform diagram, operation in the circuit construction shown in FIGS. 28 and 29 will be described.

First, when the reset signals RESET 1 and RESET 2 are lowered to L level, each flip-flop of the ring counter 413 and the shift register 428 is reset. Consequently, the Q output and the $\overline{Q}$ output of each of the D-flip-flops 414 to 417 are changed to L level and H level, respectively.

Then, the signal RAS from the timing controller 412 is raised to H level in order to set a row address of the DRAM 409. In response thereto, the signal of H level supplied from the AND gate 418 at that time is provided from the D-flip-flop 414 through its Q output. The Q output of each of the other flip-flops 415 to 417 is at L level. As a result, the AND gates 419, 422 and 425 in the selectors S1, S2 and S3 are turned off and the AND gates 420, 423 and 426 in those selectors are turned on. Thus, the shift register 428 functions as four stages of shift registers through the AND gates 420, 423 and 426 in the on state and the OR gates 421, 424 and 427.

Now, it is considered a case in which 128 data are read out by applying the signal RAS of the same cycle period by four times. In this case, 32 data are read out in one RAS active period (a period of the signal RAS at H level). When the signal RAS is at L level, accessing to the memory cannot be made and the data cannot be read out and, accordingly the signal $\overline{CAS}$ is raised to H level. The $\overline{CAS}$ synchronizes in phase with the shiftclock SHIFTCLOCK and the level thereof falls in synchronization with the fall of the subsequent shiftclock SHIFTCLOCK after change of the signal RAS from L level to H level (the signal $\overline{CAS}$ being held at H level in the period of L level of the signal RAS). The period of L level and the period of H level of the signal RAS are defined by the shiftclock SHIFTCLOCK. Thus, data is read out at the fall of the next shiftclock SHIFTCLOCK after the first rise of the signal RAS and the data is latched from the second rise of the shiftclock SHIFTCLOCK and shifted successively.

When the signal RAS is lowered to L level after an elapse of a predetermined period, reading of data is not performed. However, shifting of data in the shift register 428 is performed in response to the shiftclock SHIFTCLOCK. When the signal RAS is raised again to H level after an elapse of one shiftclock SHIFTCLOCK, the Q output of the D-flip-flop 415 in the ring counter 413 is raised to H level and the Q output of each of the other flip-flops 414, 416 and 417 is lowered to L level. As a result, the AND gate 419 is enabled and the AND gate 420 is disabled. On the other hand, in the selectors S2 and S3, the AND gates 422 and 425 are maintained in the off state and the AND gates 423 and 426 are maintained in the on state. Accordingly, the Q output of the D-flip-flop R1' is not transmitted any where, while the data DATA is transmitted to the D-flip-flop R2' through the AND gate 419 and the OR gate 421. Thus, the shift register 428 functions as three stages of shift registers. More specifically, the D-flip-flop R1' accepts the first to 32nd data and shift them successively and then operation as the shift register is completed.

The D-flip-flop R2' of the second stage latches the 33rd data at the second shiftclock SHIFTCLOCK counted from the second rise of the signal RAS and thereafter latches 34th to 64th data and shift those data successively.

Then, by repeating the above described operation, the number of stages of the shift register 428 is successively decreased one by one in response to the output from the ring counter 413. As a result, a stream of 128 data continuous without any omission is outputted from the D-flip-flop R4' of the fourth stage. When reading of one row is completed, resetting is effected. Consequently, an analog video signal obtained from the output data by D/A conversion in the D/A converter 408 does not cause any missing pixel. Thus, it becomes possible to reproduce a precise image scaled-down to a desired size by using the inexpensive DRAM.

Figure 31:
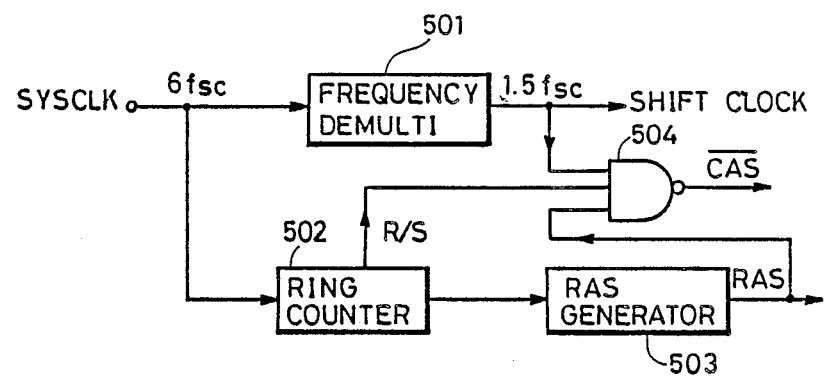
FIG. 31 shows an example of a circuit for generating control signals RAS and CAS.

FIG. 31 shows a circuit configuration for generating the signals RAS and $\overline{CAS}$ and the shiftclock SHIFTCLOCK satisfying the relations shown in FIG. 30.

The shiftclock SHIFTCLOCK is produced by a frequency demultiplier 501 which applies frequency division with a predetermined ratio ($\frac{1}{4}$ in the drawing) to a clock signal SYSCLK (used as a system clock for the microcomputer or the like in the television receiver) obtained by multiplication of color subcarrier frequency fc by an appropriate integer.

The signal RAS is generated by a ring counter 502 for counting the clock signal SYSCLK and an RAS generator 503 for outputting a signal raised to H level for a predetermined period and lowered to L level for a predetermined period in response to an output of the ring counter 502. More specifically, the ring counter 502, which is responsive to an RAS generation instruction, generates an RAS generator enabling signal and supplies it to the RAS generator 503 in response to the rise of the clock signal SYSCLK. The RAS generator 503 generates the signal RAS in response to the enabling signal from the ring counter 502.

The ring counter 502 not only generates the enabling signal in response to the RAS generation instruction signal but also generates a signal R/S delayed by one clock cycle of the clock signal. A fall of the signal R/S synchronizes with a fall of the RAS.

Figure 32:
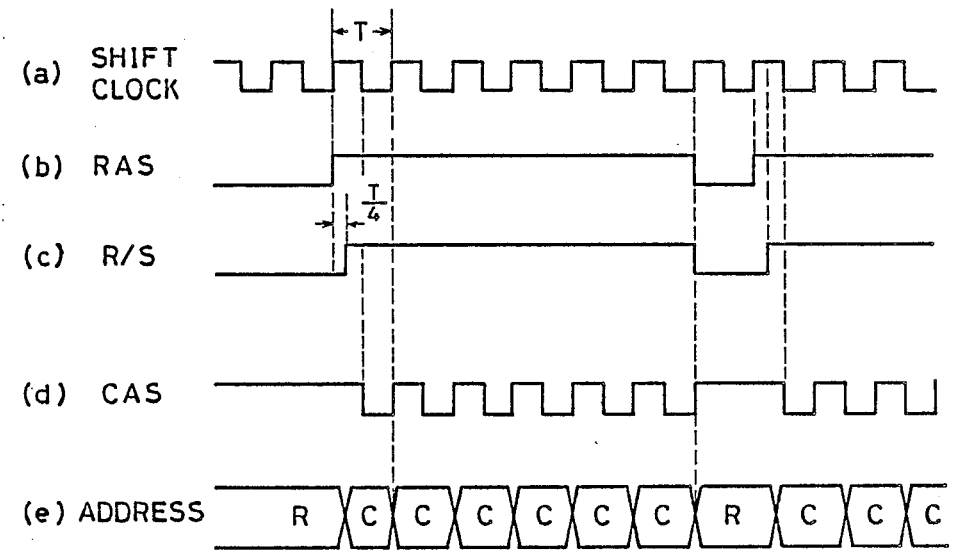
FIG. 32 is a waveform diagram showing operation of a control signal generating circuit shown in FIG. 31.

The signal $\overline{CAS}$ is generated by a three input NAND gate 504 for receiving the shiftclock SHIFTCLOCK and the signals R/S and RAS. Accordingly, as shown in FIG. 32, the signal $\overline{CAS}$ lowers to L level in synchronization with a fall of the next shiftclock SHIFTCLOCK after a rise of the signal RAS.

Although the field memories are used as memories for storing image information in the above described embodiments, frame memories for storing pixel data for two fields of the television screen may be used and the same meritorious effect as in the above described embodiments can be obtained.

As described in the foregoing, the digital television receiver according to the present invention is capable of storing desired image information currently received into memory and reproducing the video signals stored in the memory as a still image on the screen of the receiver at any time as required. Accordingly, particularly in cases where a large number of information is simultaneously displayed on the screen of the receiver for a short period, the image including the large number of information is temporarily stored as a memorandum in a memory and the image can be reproduced later so that the information displayed precisely can be obtained.

In addition, since a plurality of memories are provided, different image information can be stored in the memories without erasing the already stored image information.

In addition, since an instruction for writing image information into memory can be issued by remote control operation, image information which the user wants to store can be immediately stored without losing the timing.

In addition, when the memo key is pressed to store image information received at that time, the image information stored in the memory is reproduced on the screen of the receiver and accordingly the user can observe whether or not the desired image information is stored in the memory. Furthermore, the still image reproduced on that occasion is displayed as an image scaled-down to a predetermined size smaller than that of the normal screen and the scaled-down image is only displayed at a predetermined position (e.g., a lower left portion) on the normal screen for a predetermined period (e.g., several seconds), which does not cause any disturbance to observation of the image currently received.

In addition, since storing of image information is inhibited even if the memo key is pressed in a predetermined period until a received image becomes stable after a change of channels, any disturbed image is not stored and only a correct image can always be stored.

Since arbitrary image information currently received or predetermined significant information is written in memory after turn-on of the power supply for the television receiver, even if the call key is operated before operation of the memo key, image information written by initialization is reproduced and no disagreeable impression is caused to the user.

Since the oldest image information out of the stored image information is successively replaced by new image information automatically by operation of a single memo key, the old image information can be rewritten by new image information without taking any account of the order of storage of the information in memory and thus good operability is ensured.

In addition, since the newest image information out of the stored image information is successively reproduced as a still image automatically by operation of a single call key, good operability is also ensured for reproduction of stored information.

In addition, since a still image is reproduced with a bordering being provided around the image at the time of reproduction of a still image, the reproduced still image can be easily distinguished from an image currently received.

Further, since a thickness of a bordering surrounding a still image scaled-down and that of a bordering surrounding a still image of the normal size are different, a most suitable bordering having good balance with the size of the reproduced still image can be provided.

Further, since the color of the bordering differs corresponding to the order of storage of image information, it can be readily observed at sight when the image information being reproduced is stored.

Further, since the number of stages of the shift register for transfer of data in the image data reading portion is decreased each time the signal RAS is brought into a non-active state in the page mode, it becomes possible to obtain a scaled-down still image without any missing pixel by using an inexpensive general-purpose DRAM.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital television receiver comprising:
    means (120) for storing digital image information including a plurality of storing devices (120a, 12b),
    image storage instruction signal generating means (128);
    means (117', 122a) for writing digital image information in said storing means in response to said image storage instruction signal,
    image reading instruction signal generating means (129),
    means (117'), 122b) for repeatedly reading at a first speed the image reading instruction signal, and
    means (121, 123, 124, 115) for reproducing the image information on a display screen of a picture tube (116) upon receipt of the output of said reading means,
    means (117') for generating a first storage device selection signal in response to said storage instruction signal,
    means (117') for generating a second storage device selection signal in response to said image reading instruction signal,
    means (122c) for selecting a corresponding storage device in response to said first storage device selection signal and connecting the selected storage device to said writing means, and
    means (112c) for selecting the corresponding storage device in response to said second storage device selection signal and connecting the selected storage device to said reading means.

2. A digital television receiver in accordance with claim 1, wherein said image storage instruction signal generating means and said image reading instruction signal generating means are both provided in a remote control transmitter (118) for remote control of said digital television receiver.

3. A digital television receiver comprising:
    means (120) for storing digital image information,
    image storage instruction signal generating means (128);
    means (117', 122a) for writing digital image information in said storing means in response to said image storage instruction signal,
    image reading instruction signal generating means (129),
    means (117', 122b) for repeatedly reading at a first speed the image information stored in said storing means, in response to said image reading instruction signal, and
    means (121, 123, 124, 115) for reproducing the image information on a display screen of a picture tube (116) upon receipt of the output of said reading means, wherein said reading means is capable of reading image information from said storing means either at the first speed or at a second speed higher than said first speed, said digital television receiver further comprising:

means (117') for detecting completion of writing operation of said writing means, means (117', 122c) responsive to a detection signal from said completion detecting means, for connecting, to said reading means, the storing means where the writing of the image information by said writing means has been completed and means (117') responsive to the detection signal from said completion detecting means, for enabling said reading means and setting the reading speed of said reading means to said second speed.

4. A digital television receiver comprising:

means (120) for storing digital image information, image storage instruction signal generating means (128);

means (117', 122a) for writing digital image information in said storing means in response to said image storage instruction signal, image reading instruction signal generating means (129), means (117', 122b) for repeatedly reading at a first speed the image information stored in said storing means, in response to said image reading instruction signal, and means (121, 123, 124, 115) for reproducing the image information on a display screen of a picture tube (116) upon receipt of the output of said reading means, means (100) for generating a signal for designating a channel for reception by said digital television receiver, channel change detecting means (117') for detecting designation of a channel different from a currently received channel, upon receipt of the output of said channel designation signal generating means, and means (117', 130) for invalidating said image storage instruction signal for a predetermined period in response to a channel change detection signal from said channel change detecting means.

5. A digital television receiver comprising:

means (120) for storing digital image information, image storage instruction signal generating means (128);

means (117',122a) for writing digital image information in said storing means in response to said image storage instruction signal, image reading instruction signal generating means (129), means (117', 122b) for repeatedly reading at a first speed the image information stored in said storing means, in response to said image reading instruction signal, and means (121, 123, 124, 115) for reproducing the image information on a display screen of a picture tube (116) upon receipt of the output of said reading means, means (117') for detecting turn-on of power supply for said digital television receiver, and means (117', 122a) responsive to an output of said power supply turn-on detecting means for writing predetermined significant information into said storing means after an elapse of a predetermined period from said turn-on of the power supply.

6. A digital television receiver in accordance with claim 5, wherein said predetermined significant information is image information received by said digital television receiver at the elapse of said predetermined period.

7. A digital television receiver comprising:

means (120) for storing digital image information including a plurality of storing devices (120a, 12b), image storage instruction signal generating means (128);

means (117', 122a) for writing digital image information in said storing means in response to said image storage instruction signal, image reading instruction signal generating means (129), means (117', 122b) for repeatedly reading at a first speed the image information stored in said storing means, in response to said image reading instruction signal, and means (121, 123, 124, 115) for reproducing the image information on a display screen of a picture tube (116) upon receipt of the output of said reading means, means (233) for storing a writing order in which information is written in said storage devices, and means (117', 122a, 122c) responsive to said image storage instruction signal, for writing image information into the storage device having the oldest order stored in said writing order storing means.

8. A digital television receiver comprising:

means (120) for storing digital image information including a plurality of storing devices (120a, 12b), image storage instruction signal generating means (128);

means (117', 122a) for writing digital image information in said storing means in response to said image storage instruction signal, image reading instruction signal generating means (129), means (117', 122b) for repeatedly reading at a first speed the image information stored in said storing means, in response to said image reading instruction signal, and means (121, 123, 124, 115) for reproducing the image information on a display screen of a picture tube (116) upon receipt of the output of said reading means, means (232) for storing a writing order in which information is written in said storage devices, and means (117', 122b, 122c) in response to said image reading instruction signal, for reading image information of the storage device having the most recent order stored by said writing order storing means.

9. A digital television receiver in accordance with claim 8, further comprising:

means (231) for storing the number of storage devices, a first register (232) the content of which is incremented upon completion of writing into any one of said storage devices, a second register (233) to which the content of said first register is transferred, means (117') for comparing the content of said number storing means and the content of said first register and resetting the content of said first register when the content of said first register becomes larger than the content of said number storing means, means (117') for decrementing the content of said second register in response to reading of image information from any one of the storage devices and transferring the content of said number storing means to said second register when the content of said second register attains an initial predetermined set value, and means (117'122b, 122c) responsive to said image reading instruction signal, for repeatedly reading image information in the storage device corresponding to the content of said second register.

10. A digital television receiver in accordance with claim 3, further comprising means (314, 330, 117', 122b) responsive to said image reading instruction signal, for providing a color signal fixed for a predetermined time length before and after said reading means reads out image information from said storing means, thereby to add a bordering to an image read out and reproduced from said storing means, wherein said predetermined time length is adapted to differ dependent on whether the reading speed of said reading means is said first speed or said second speed.

11. A digital television receiver comprising:

means (120) for storing digital image information including a plurality of storing devices (120a120b), image storage instruction signal generating means (128);

means (117', 122a) for writing digital image information in said storing means in response to said image storage instruction signal, image reading instruction signal generating means (129), means (117', 122b) for repeatedly reading at a first speed the image information stored in said storing means, in response to said image reading instruction signal, and means (121, 123, 124, 115) for reproducing the image information on a display screen of a picture tube (116) upon receipt of the output of said reading means, means (314, 330, 117', 122b) responsive to said image reading instruction signal, for providing a color signal fixed for a predetermined time length before and after said reading means reads image information from said storing means, thereby to add a bordering to an image read out and reproduced from said storing means, wherein a color of said bordering is adapted to differ for each of the storage devices from which said reading means reads out image information.

12. A digital television receiver comprising:

means (120) for storing digital image information including a plurality of storing devices (120a, 12b), image storage instruction signal generating means (128);

means (117', 122a) for writing digital image information in said storing means in response to said image storage instruction signal, image reading instruction signal generating means (129), means (117', 122b) for repeatedly reading at a first speed the image information stored in said storing means, in response to said image reading instruction signal, and means (121, 123, 124, 115) for reproducing the image information on a display screen of a picture tube (116) upon receipt of the output of said reading means, means (314, 330, 117', 122b) responsive to said image reading instruction signal, for providing a color signal fixed for a predetermined time length before and after said reading means reads image information from said storing means, thereby to add a bordering to an image read out and reproduced from said storing means wherein the number of said storage devices is two, said digital television receiver further comprising:

means (122b) for generating a bordering addition instruction signal (kd) in response to said image reading instruction signal, means (117') for generating a bordering color designation signal (Kc) in response to said reading instruction signal, a level of said bordering color designation signal being defined corresponding to the content of a register, means (314R, 314G, 314B) for forming three kinds of color signals from color-difference signals and a luminance signal formed in said television receiver, means (G1, ZD, D1, D2, D3) for clamping said color-difference signals to a predetermined level in response to said bordering addition instruction signal, means (G2, Q1) for inactivating the first color signal out of said three kinds of color signals in response to said bordering addition instruction signal, and means (G3, Q2) for inactivating the second color signal out of said three kinds of color signals in response to said bordering addition instruction signal and said bordering color designation signal.

13. A digital television receiver comprising:

means (120) for storing digital image information including a plurality of storing devices (120a, 120b), image storage instruction signal generating means (128);

means (117', 122a) for writing digital image information in said storing means in response to said image storage instruction signal, image reading instruction signal generating means (129), means (117',122b) for repeatedly reading at a first speed the image information stored in said storing means, in response to said image reading instruction signal, and means (121, 123, 124, 115) for reproducing the image information on a display screen of a picture tube (116) upon receipt of the output of said reading means (120a, 120b), means (314, 330, 117', 122b) responsive to said image reading instruction signal, for providing a color signal fixed for a predetermined time length before and after said reading means reads image information from said storing means, thereby to add a bordering to an image read out and reproduced from said storing means, wherein a color of said bordering is adapted to differ dependent on newness of contents of the storage devices read out by said reading means.

* * * * *